United States Patent
Kitts et al.

(10) Patent No.: US 11,232,473 B2
(45) Date of Patent: Jan. 25, 2022

(54) DEMOGRAPHIC PREDICTION USING AGGREGATED LABELED DATA

(71) Applicant: Adap.tv, Inc., Dulles, VA (US)

(72) Inventors: Brendan Kitts, Seattle, WA (US); Garrett James Badeau, Redwood City, CA (US); Davood Shamsi, New York, NY (US); Yongbo Zeng, Covina, CA (US); Liang Wei, Foster City, CA (US); Andrew George Potter, Mountain View, CA (US); Sergei Tolkachov, Belmont, CA (US)

(73) Assignee: ADAP.TV, INC., Dulles, VA (US)

( * ) Notice: Subject to any disclaimer, the term of this patent is extended or adjusted under 35 U.S.C. 154(b) by 1064 days.

(21) Appl. No.: 15/268,449

(22) Filed: Sep. 16, 2016

(65) Prior Publication Data
US 2018/0082325 A1   Mar. 22, 2018

(51) Int. Cl.
G06Q 30/02   (2012.01)
(52) U.S. Cl.
CPC ..... *G06Q 30/0242* (2013.01); *G06Q 30/0251* (2013.01); *G06Q 30/0277* (2013.01)
(58) Field of Classification Search
None
See application file for complete search history.

(56) References Cited

U.S. PATENT DOCUMENTS

| | | | |
|---|---|---|---|
| 10,261,938 B1 * | 4/2019 | Jenkins | G06F 15/167 |
| 2003/0101024 A1 * | 5/2003 | Adar | G06Q 30/02 702/187 |
| 2009/0024546 A1 * | 1/2009 | Ficcaglia | G06F 16/9535 706/12 |
| 2010/0161385 A1 * | 6/2010 | Karypis | G06Q 10/04 705/7.31 |
| 2011/0238474 A1 * | 9/2011 | Carr | G06Q 30/0639 705/14.23 |
| 2016/0155143 A1 * | 6/2016 | Hsiao | G06Q 30/0246 705/14.45 |

OTHER PUBLICATIONS

R. Berwick, "An Idiot's guide to Support vector machines (SVMs)," Mar. 28, 2016, MIT, pp. 1-28. (Retrieved from the Wayback Machine on Sep. 28, 2020.) (Year: 2016).*

* cited by examiner

*Primary Examiner* — Christopher B Tokarczyk
(74) *Attorney, Agent, or Firm* — Cooper Legal Group, LLC

(57) ABSTRACT

Systems and methods are disclosed for demographic prediction based on aggregated training data. The predictions are based on auditing aggregated data associated with identified properties of web requests. The audited information is based on a batch of prior web requests that have the same property and have been audited by a measurement company.

18 Claims, 22 Drawing Sheets

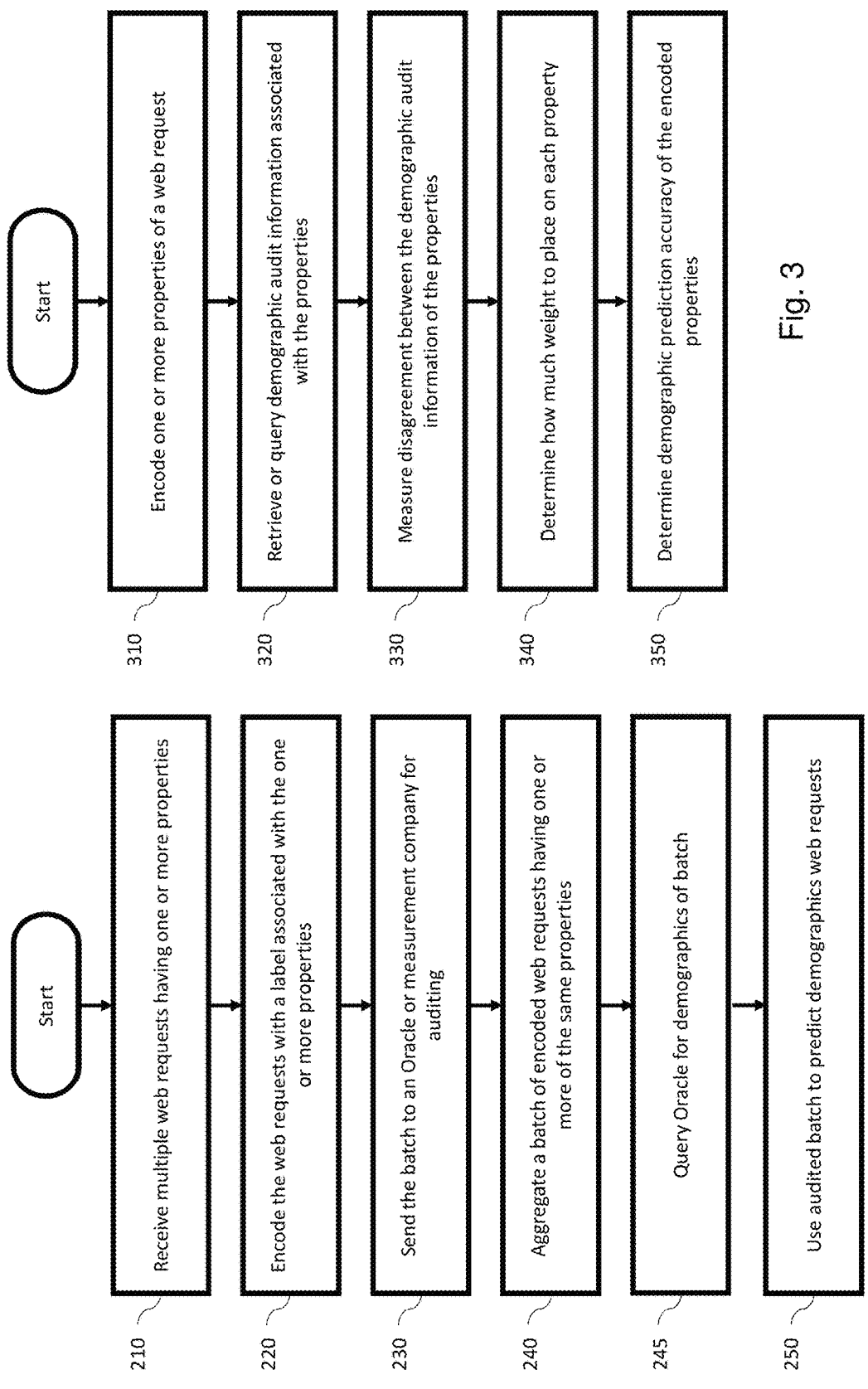

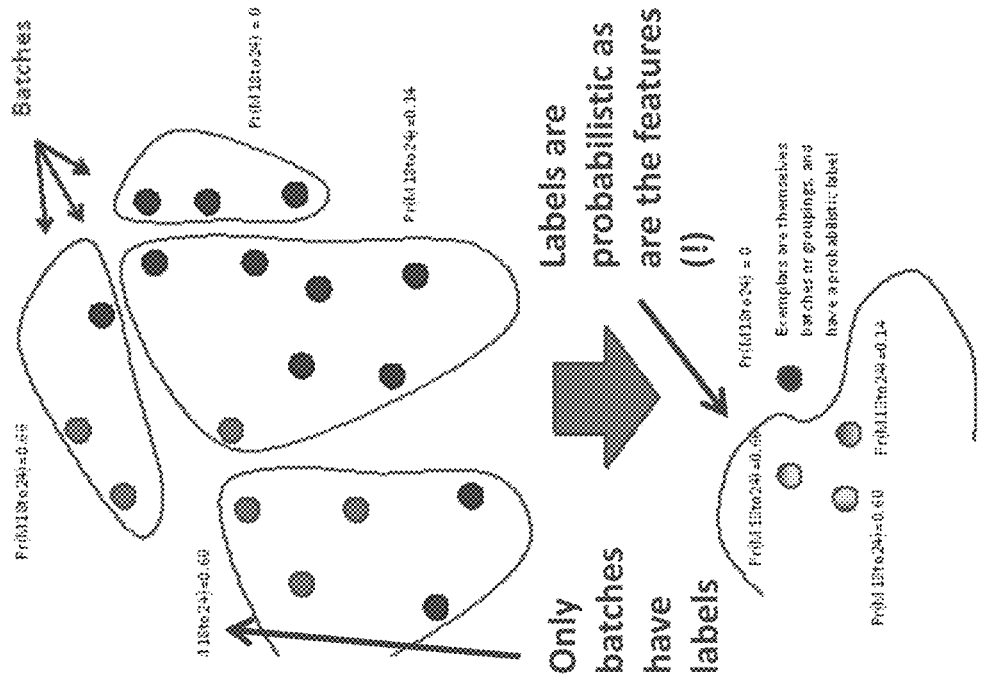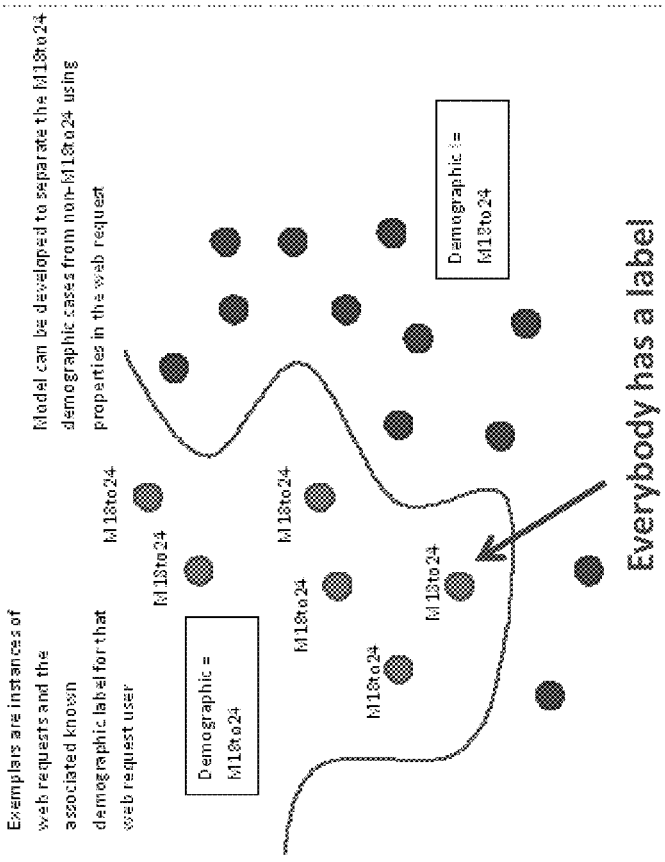
FIG. 4

Standard deviation for audit probability from set of segments on incoming request (x-axis) versus hold-out set prediction quality (y-axis). The more that the segments disagreed, the worse became the prediction performance.

Distribution comparison for two algorithms; each algorithm is predicting high probability of demo=1011 (Female Age 55-64). One can see that BAVG has more Oracle impressions in the 1011 bucket, and fewer in other buckets.

Distribution comparison for two algorithms across several demographics. In general, BAVG produces more impressions in the correct demographic, and fewer in incorrect demographics.

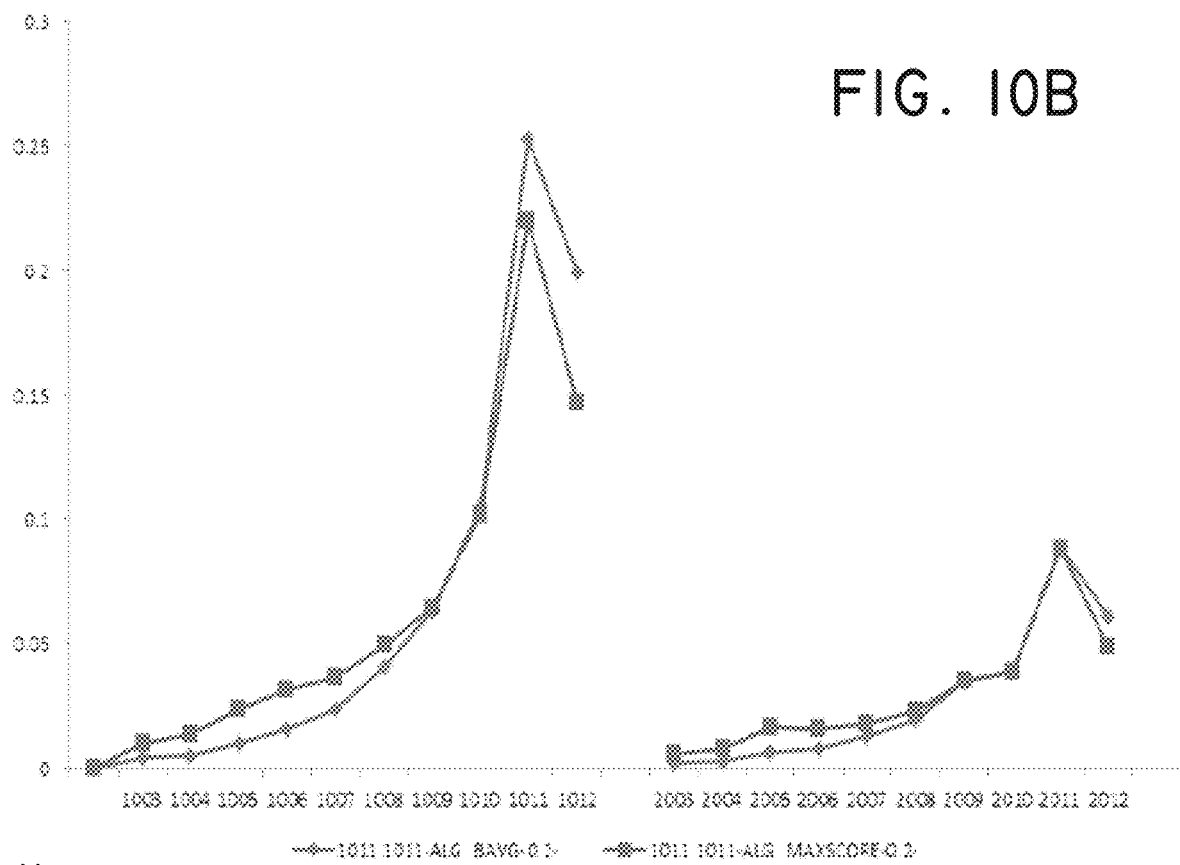
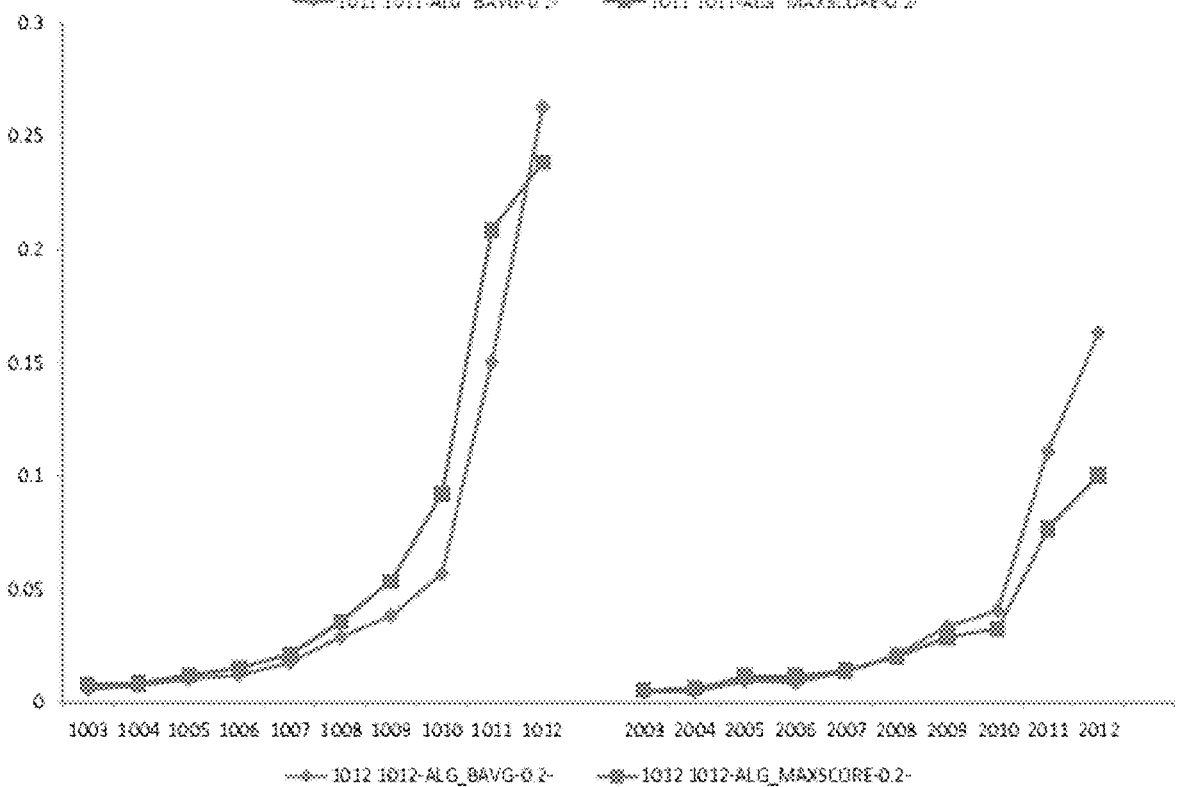
FIG. 10B

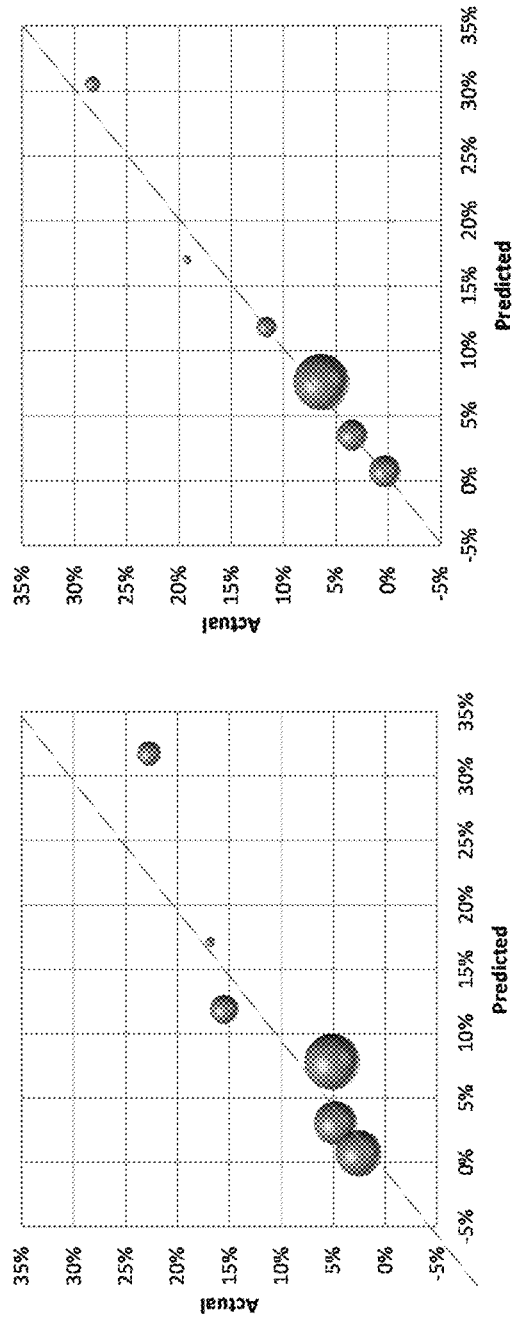

Fig. 11

Prediction versus actual for SAVG (left) and BAVG (right). Bubble size is equal to the percentage of traffic in this prediction bucket. BAVG has much lower average error. In addition, SAVG even shows some signs of regression the mean phenomena – the lower bucket is too high and the highest bucket is too low. This can occur when spuriously high or low predictions are used. BAVG reverts to site information when there is disagreement amongst segments.

ABTest logic: During Demo predictor evaluation, multiple algorithms may be executed.

Example of a poor demographic predictor model. The model is trying to predict Female 45-54. However the Oracle reports that the majority of impressions are actually Male 45-54. This would be undesirable for an advertiser.

Example of a better demographic predictor for the task of predicting Female 45-54. The majority of impressions are in the Female 45-54 age-gender range.

| targ | demoalg | geo | In-target rate | Impressions | Random in-target rate | In-target rate lift |
|---|---|---|---|---|---|---|
| W18to24 | bavg | Fresno | 20% | 3,017 | 0.0537195 | 3.73 |
| | | Shreveport | 15% | 3,709 | 0.0537195 | 2.81 |
| | segavg | Wilmington | 17% | 3,726 | 0.0537195 | 3.09 |
| | | FLORENCE,SC | 15% | 4,182 | 0.0537195 | 2.88 |
| | | LITTLE ROCK,AR | 9% | 4,006 | 0.0537195 | 1.62 |

In-target report for different geographic areas. Two algorithms were used – bavg and segavg. The in-target rate lifts are reported for each.

Fig. 18

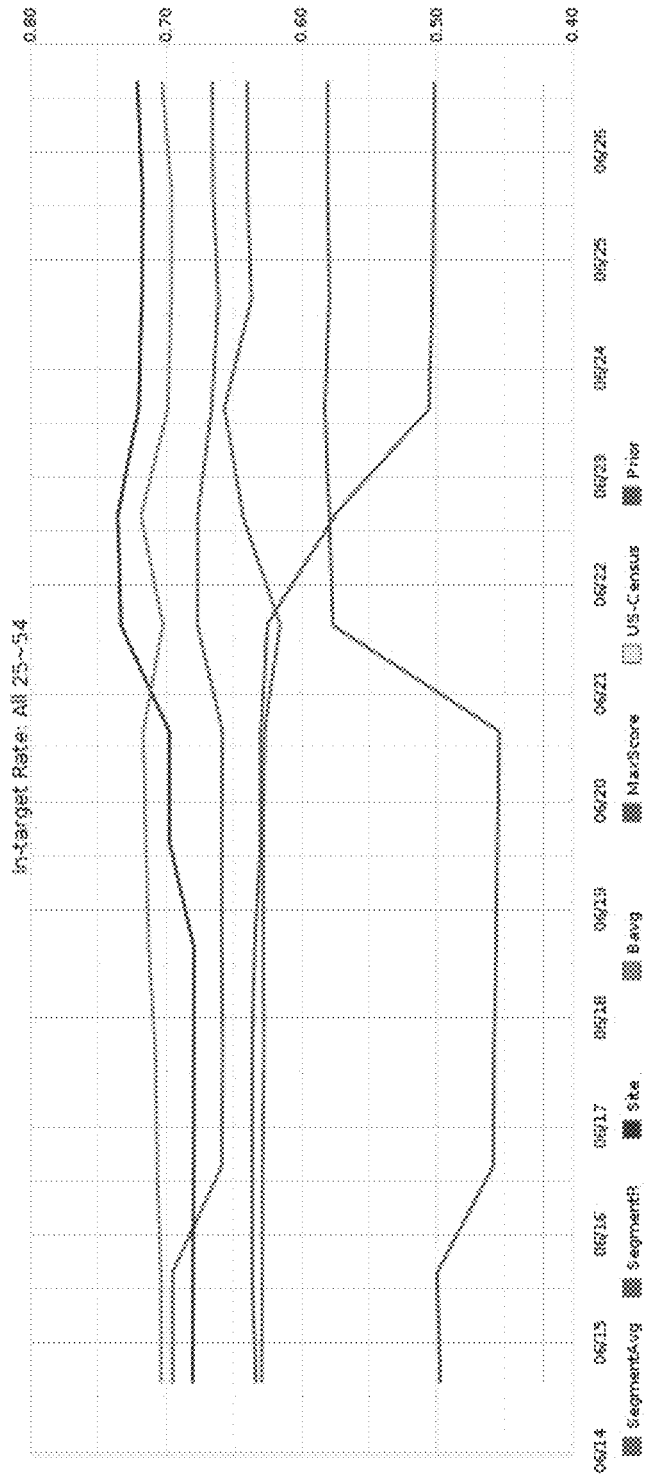

Monitoring graph showing in-target rate for different algorithms referred in the invention. Bavg tends to have the highest in-target rate, although on 6/21 Site algorithm started showing higher performance. Max80% refers to 80% of the maximum in-target possible given the population at random encountered in sites that are being advertised on. US-Census is the in-target rate, if we were able to equal the US-Census (in-general the online population doesn't exactly match US census).

Fig. 19

Monitoring graph showing in-target rate for different algorithms referred in the invention. Bavg tends to have the highest in-target rate, although on 6/21 Site algorithm started showing higher performance. The above graph is monitoring algorithm in-target lift on Adults 25 to 54. Max80% refers to 80% of the maximum lift possible.

In-Target % for 12 different third party demographic providers (A through M). The top measure is in-target rate, and the bottom measure is the in-target lift. The demographic being measured is W18to24.

DEMOGRAPHIC PREDICTION USING AGGREGATED LABELED DATA

BACKGROUND

When a user visits a website, it is desirable for the website publisher to understand the demographics of the user in order to determine what content might be of greatest interest to them. Accurate demographic prediction can result in an improved experience for the user from an ability to better target content of interest for them.

Ad Servers also have a critical need to also be able to predict the demographics of the user, so as to deliver the right advertising content to them. There also are important financial reasons for being able to do this accurately. A standard method of calculating an advertiser's Cost Per Acquisition (the amount paid per valuable event) in online advertising is as follows:

$$CPA = \frac{Cost}{A} = \frac{(I*CPI)}{I*Pr(a)} = \frac{CPI}{Pr(a)}$$

where Cost=Spend by advertiser; A=acquisitions by advertiser; I=impressions; CPI=cost per impression; Pr(a) =probability of acquisition per impression. We will refer to ITR(i) or in-target-rate as the number of impressions which have the correct demographic, divided by total impressions. In general, if the advertiser has correctly identified their most responsive audience, then the probability of acquisition (acquisitions per impression) that they achieve by delivering their ad, should be proportional to the in-target rate.

$$Pr(a)=c*ITR(i)$$

If we increase the ITR (i) by a factor of x then we have:

$$CPI*=Pr(a)*x*CPA=x*CPI$$

Therefore, if TR(i) increases by x, then the advertiser could increase their budget and price paid per impression by x, the advertiser can acquire x times the acquisitions, and the ad server in turn could make approximately x times more revenue. To put it simply, the amount of money that an ad-server makes is proportional to the in-target-rate that they can achieve. If they can increase in-target rate from 10% to 20%, they should make twice as much money. Therefore, computational systems to allocate impressions so maximize in-target-rate are of great interest.

Better demographic targeting provides benefits for other parties in the ecosystem also. When ad servers achieve higher advertising revenues, they are able to provide higher payouts back to the publishers who host the ads. In addition, users—people visiting web pages—receive ads that are more relevant to their particular interests, age group, gender, and other characteristics. More relevant ads can make ads interesting, useful, and informative. There is evidence in paid search auctions that paid links are able to achieve high levels of ad relevance. Therefore, better matching of ad demographics to the user, can mean better advertiser ROI, ad server revenue, and publisher revenue, and a better user experience for ad supported web browsing.

Demographic targeting technology is used in the largest content delivery platforms in the world. Platforms the likes of Facebook, AOL, Google Adwords, Bing, Yahoo, and others, allow advertisers and other content providers to target based on demographics. Typically these platforms utilize what can be termed "first party data" to predict demographics. First party data comprises a set users with known demographics to predict the demographics of other users, and usually owned by the publisher or network. For example, a platform such as Facebook may have access to age and gender based on the profiles voluntarily created by users, along with content interests, and browsing behavior on facebook.com. Facebook can then use interests and browsing behavior for users with known age to predict age and gender of other users who haven't provided this information. First party demographic data can be effective, but it can also be subject to many limitations: (1) Users may not wish to disclose their demographic data, and on certain sites if there is little demographic data, that can make prediction difficult (2) Users may employ "do not track" features on browser to hide their browsing history, (3) Users may not want their information used in this way, (4) The population that makes available their demographics may be a biased population, and predictions based on those individuals may also be erroneous, (5) Often the publisher that is providing the demographic predictions, is also the same entity that is selling inventory—as a result there is a potential conflict-of-interest when the demographic estimates are being quoted for sale—the publisher may have a vested interest in what numbers are being reported, (6) There may be legal restrictions around the use of browsing histories if the users haven't opted into allowing their data to be used in this way Third Party Demographic Verification or Ratings services are an alternative method for reporting on demographics, and until now they have tended to occupy a different niche in advertising. Examples of these Rating Companies include Nielsen and Comscore. Both companies maintain a panel of paid volunteers who enable their activity to be tracked. Using their panel, they then determine how many people were watching television or webpages at a given time. These companies are independent from publishers and advertisers both, and therefore are often favored because they have no obvious bias or incentives, and bring their own independent "measuring stick" to report on demographics on a website or television program. In the case of television ratings, Nielsen Corporation has become almost a de-facto standard or currency that is used and quoted by advertisers, publishers, and television networks alike. Nielsen and Comscore are currently trying to expand their panel-based methods to work in the growing space of online advertising.

Rating company panels comprise individuals who allow their personal information to be reported anonymously. Comscore's Validated Campaign Essentials (VCE) product comprises a 1 million sized panel of persons who allow their online behavior to be tracked and reported. Nielsen Corporation maintains a panel with 200,000 US persons, and offers reporting through their Digital Ad Ratings product. Because these Rating companies are not selling media, but instead sell "ratings measurement" services to both media sellers and buyers, they should have no vested interest in any particular outcomes—their only interest should be to provide the most accurate demographic numbers possible. They also have a direct first party relationship with their panelists, who agree for their data to be used anonymously in aggregate, thereby providing strong legal explicit opt-ins for their panelists which are not reliant upon third party cookie tracking, and are not subject to "do not track" opt-outs which many users currently use on browsers. These Rating services put much effort into ensuring that their panels are representative of the wider United States digital or television viewing population, and are often so trusted that they are used by advertisers for billing purposes, and as an agreed-upon method for measuring campaign performance.

Third party Oracle Ratings are often quite different in format from the "first party data" described earlier that Facebook or Yahoo or others might utilize. (1) Oracle data is generally aggregated, meaning that there is usually no information on the demographics of any particular web request or user (unlike the first party data). (2) Oracle data is generally provided after-the-fact—i.e. after advertising the exposures have occurred. Aggregating the data serves two useful purposes for ratings companies (a) it helps to keep individual panelist data private, so that the Oracle companies only report aggregated results, and (b) it helps to ensure that their panelist demographics can avoid being 're-identified' or cached by a subscriber. (For example, if the Oracle reported that user A had demographic B, then the subscribing publisher could simply then cache the fact that user A had demographic B. After encountering 1 million or so panelists, the publisher would effectively have a copy of the Oracle's database of panelists. At that point, the publisher could simply terminate their relationship with the Ratings company and then use the Oracle demographics. By aggregating, Ratings companies make it difficult to improperly save and use their expensive and highly curated panelist data, ensuring that publishers should continue to call to determine demographics).

It is common for Oracle data to be used for after-the-fact reporting, verification and billing purposes. For example, advertisers may set up contract terms that specify that a certain number of impressions, matching a particular demographic age-gender range, need to be delivered, at a certain cost per million impressions. However because Oracle data is aggregated, batched, and delayed, and panel-based (so a limited population sub-set) it is generally not used for real-time decisions about whether to buy or not buy impressions. This invention describes a method for taking a data source which is commonly used for reporting, is aggregated, batched, and after-the-fact, and uses this data source for improving real-time prediction. The resulting predictions system uses what we call "Oracle Models" to predict demographics. Oracle Models can carry significant advantages compared to the first party approach. Since these third party ratings companies are often the "score keepers" that advertisers use when they want independent ratings measurement, developing predictions based on Oracles may offer significant advantages. For example, by learning about demographics across different web request properties, it may be possible to plan campaigns and predict the demographics of incoming web requests, using the same units that are being used by the Oracles which are used for final after-the-fact demographic measurement. This may result in much more accurate demographic predictions, higher in-target rates, and happier advertisers and publishers.

SUMMARY

Embodiments described herein are directed to improving demographic prediction based on aggregated training data. More specifically, some embodiments of the invention relate to systems or methods having a demographic predictor that can predict demographics for web requests. The predictions are based at least in part on aggregated demographic audit information associated with one or more properties of the web request. In particular, audit information is based on a batch of prior web requests that have the same property and have been audited by a third party known as an Oracle or a measurement company. In some cases, one or more batches of prior web requests can be encoded with properties that are sent to the third party (i.e., Oracle or measurement company) to query demographic information associated with the batches so that audited demographic information associated with the encoded property is returned.

In some embodiments of the invention, the demographic predictor may additionally base demographic predictions on request-level sources of information. And in some instances, the request-level sources of information can comprise a user-identifier that is or can be associated with demographic information for the user whom is associated with the request.

It is also possible for the aggregated demographic audit information to include multiple web request properties. In these instances, the demographic predictor can measure disagreement between the demographic audit information of the web request properties to determine how much weight to place on each of them for predicting demographics of the web request.

In some embodiments a plurality of demographic audit information may be used, each originating from a corresponding batch of prior web requests that have been audited by a third party such as an Oracle or a measurement company. One example is where the aggregated demographic audit information comprises a plurality of web request properties and where the demographic predictor measures disagreement between the demographic audit information of the web request properties to determine how much weight to place on them for predicting demographics of the web request. Determining which web request properties to weight can involve use of the aggregated demographic audit information from audit batches as training cases. A matrix of probabilities can then be created to represent the expression rate of different probabilities in each audit batch.

In some embodiments of the invention, the demographic predictor can comprise a plurality of demographic prediction models and the web request properties can include a measure of the prediction from each model. The demographic predictor can then use the demographic audit information to predict accuracy of a plurality of demographic prediction models for the web request and select one demographic prediction model to apply for predicting demographics of a web request.

Some embodiments of the invention relate to further performing quality checks on the demographic audit information prior to using the information for prediction. In another embodiment, the property of the web request can comprise a label representing a predicted demographic of the user and the expected probability range of the predicted demographic. Audited demographic information can be compared to the label to determine the accuracy of the label. As the accuracy of multiple labels is determined, the accuracy of any one label can be compared with the accuracy of one or more other labels. The demographic predictor can then select a demographic prediction model to apply for predicting demographics of a web request based on the compared accuracy of the labels.

Other embodiments of the invention relate to training a demographic predictor. In one embodiment, one or more properties of a plurality of first web requests are encoded. The encoded web requests are then used to generate demographic audit information associated with the plurality of encoded requests. By measuring disagreement between the demographic audit information of the web request properties, it is possible to determine how much weight to place on them for predicting demographics of a second web request. One training embodiment further involves determining respective measures of demographic prediction accuracy of the encoded properties of the plurality of first web requests.

Another embodiment involves the additional steps of determining which web request properties to weight based on querying demographic information for audit batches as training cases and creating a matrix of probabilities to represent the expression rate of different properties in each audit batch.

Another embodiment of the invention relating to training a demographic predictor involves the steps of obtaining demographic audit information associated with a plurality of encoded web requests where the audit information has audit batch demographic probabilities. A logistic regression model is then trained by regressing it on vectors of audit batch properties against the audit batch demographic probabilities.

Some embodiments of the invention relate to measuring accuracy of a demographic information provider. For example, in one embodiment an alleged demographic for a web request is obtained from a demographic provider. A plurality of web requests having the alleged demographic are aggregated and sent to a third party, such as an Oracle or measurement company, for auditing. The alleged demographic can then be compared to the demographic audit results to calculate the accuracy of the demographic information provider.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

FIGS. 2 and 3 are flow diagrams illustrating encoding of web requests in accordance with some implementations of the present disclosure and the generation of audited batch demographic information for use to predict demographics of web requests in accordance with some implementations of the invention;

FIG. 4 is a comparison between a machine learning problem for demographic prediction and an Oracle prediction problem;

FIGS. 9, 10A and 10B are illustrations of accuracy of different models in accordance with some implementations of the disclosure;

FIG. 11 is an illustration comparing prediction versus actual of two different models in accordance with some implementations of the disclosure;

FIG. 14 is an illustration of the use of raw algorithm audit data in some embodiments of the disclosure;

FIGS. 15 and 16 are illustrations of demographic distribution for labels in accordance with some implementations of the disclosure;

FIG. 18 is an illustration of in-target reporting in accordance with some implementations of the disclosure;

FIGS. 19 and 20 are illustrations of performance monitoring in accordance with some implementations of the disclosure;

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Mechanics of Demographic Assignment

Figure 1:
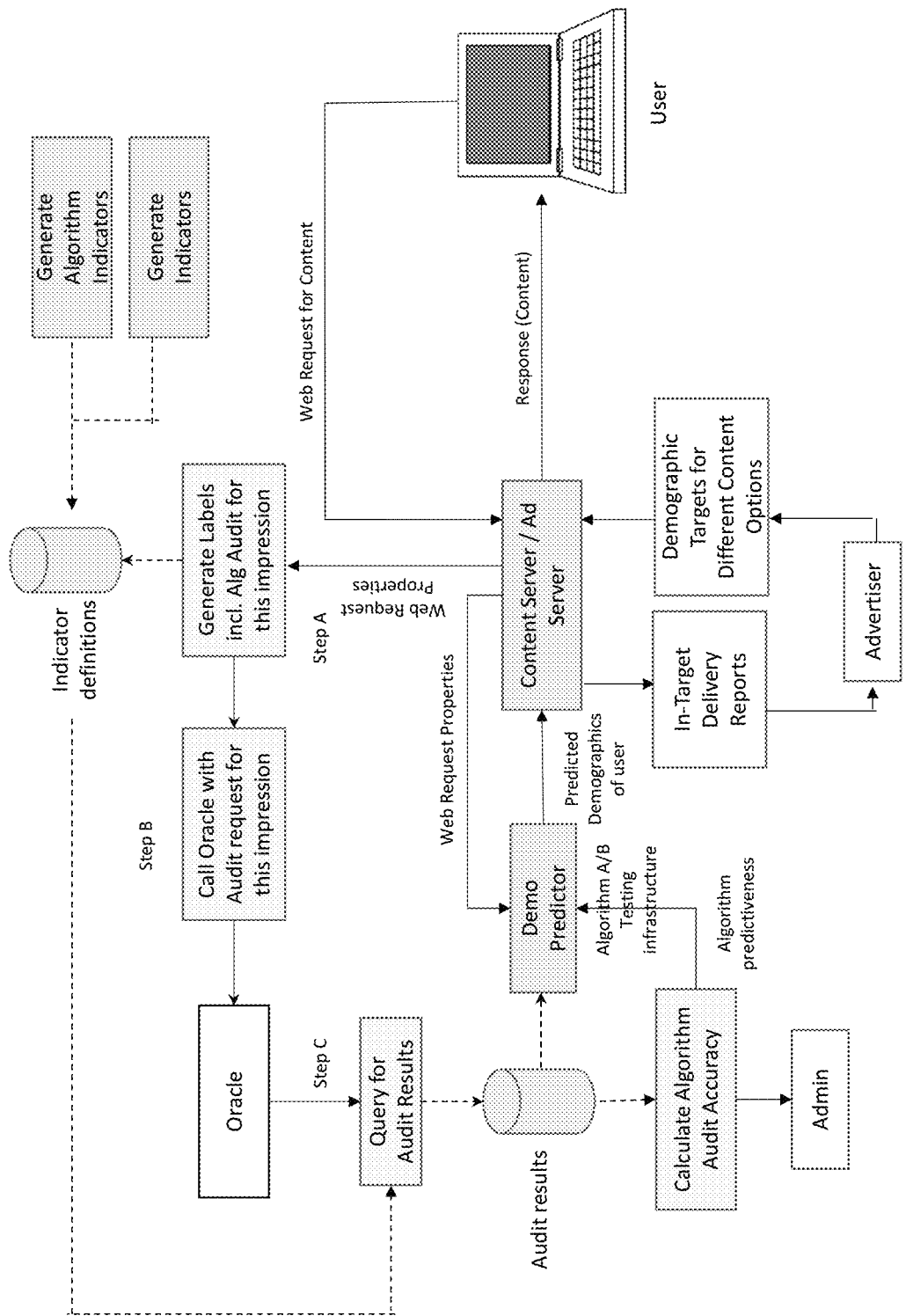
FIG. 1 is an illustration of a demographic predictor and related elements of the invention in accordance with some implementations of the present disclosure.

Referring to FIG. 1, some modern content delivery servers and ad servers work by sending data (step a) to measurement company providers (also described herein as an Oracle) of the traffic they want audited. Rather than responding with demographic information right away for each request, however, the measurement company batches up the requests they have received. After reaching a sufficient threshold, for example, a batch of 10,000 requests, it can then be interrogated (step b) to report back on the demographic percentages in the 10,000 batch of requests (step c). One of the benefits of this approach is that it ensures panelist privacy and also is a security feature to ensure that the requesting party can't just develop a cache of the demographics for each user, and thereby replicate the panel that the data company is paying its panelists to maintain.

When a content provider sends a request to a measurement company, they can also send a convenient label for the traffic to the measurement company—which is still batched to 10,000—so that the content provider can execute particular audits. For example, the requestor can audit a particular site (e.g. cnn.com), ad campaign, user segment, or even time of day. Typically, a batch of 10,000 requests is created.

The hard part is next: in some content delivery scenarios, such as delivering an ad, each ad request is a billable event, so the ad server needs to ensure that the advertiser is reaching the desired demographic audience in order to run a successful campaign. Thus, the ad server needs to predict the demographics of every individual request. Because the measuring company reports aggregated demographics data in batches of 10,000, however, the technical challenge is to determine how to improve the ability to accurately predict the demographics of a request based on training data which has been purposely aggregated in order to avoid revealing the demographics of individual ad requests.

This problem has not been dealt with at length in the literature. Improved demographic prediction has enormous significance for content providers, including the advertising industry. Because advertisers are often billed in proportion to their fulfillment of demographic, an improvement on accuracy would be a significant technical accomplishment.

Demographic Prediction where Individual Case Labels are Available

Demographic prediction is a staple of web traffic analysis, and much previous work has been published on predicting demographics—when individual labels are present. We might describe this as prediction using first party data, and with labeled cases. This is a "standard" machine learning problem where a subset of users has a known class label, and others need to be inferred.

Some representative work of this ilk includes Hua et. al. (2007), who used Windows live login data to build a set of users with known age, gender, and then try to predict probability of age-gender using keywords, webpages. Bi et. al. (2010) used a similar approach with Bing search queries. Weber and Castillo (2010) also predicted demographics using Yahoo! Registered users who have self-reported their demographics. Ulges et. al. (2012) used Youtube registration data to predict demographics based on video viewership. In some other domains there is a similar requirement to measure a variable based on samples. For example, Geologists need to estimate the expected ore concentration from different geological deposits, based on sparse exploratory drill holes. (Everett, 2013).

The present invention differs from previous work because our demographic data is on an aggregated batch of persons—i.e. there are no known demographics at the individual person level. Whereas the previous work is a straight-forward machine learning task with labeled cases, the problem that is overcome by the present invention is not a straight-forward machine learning task because we don't have labeled cases. Instead, the present invention uses a labeled aggregate. When working with this kind of data, a variety of special techniques need to be used to cope with the loss of information.

Exact Demographic Re-Identification Given Sufficient Samples

It is possible to propose a "degenerate" solution to the problem, where individual user demographics can be re-identified exactly. Since the content provider or ad server can design the batches, it can then send samples of the set of users, with a different label each time, and observe the resulting probability distribution when each user is present in the sample.

Let U be a 0-1 matrix where columns are users, and rows refer to batches. Y is a vector of Oracle-provided audit scores with rows equal to batches, then we have the unknown probabilities P equal to:

$$P=U^{-1}\cdot Y$$

This has been used for inferring player contribution ratings in team games. Performance information is available at the team level, but using this analogy in our case we would want to create rankings for individual team players. With enough repeated games it is possible to estimate the underlying individual player contribution scores. Huang et. al. (2006) and Menke and Martinez (2009) both describe systems that infer individual player performance using team outcome data.

This kind of solution is possible because the number of games (aggregate batches) is large, and the count of players in each game small (e.g., 2 to 8 players). With 8 players, for example, one would expect the player's positive or negative contribution to the final score to be about $1/8=12.5\%$. This is a fairly sizable signal. Thus, over a large number of team games in which sometimes the player participates and other times they do not, it is possible to build player contribution scores based on the events in which they participated.

Unlike the gaming scenario, however, demographic prediction for content delivery involves a vast number of users. In addition, the demographic auditing mechanism has been purposely designed to prevent this from taking place. The batch sizes are purposely very large (e.g. 10,000). This means that any one user's demographics has almost no bearing on the demographics of the aggregated batch; signal is about $1/10,000=0.01\%$, which is far weaker than in the game playing example. In addition, audits are costly, so the number are also modest (e.g. 10,000 over a year). Given these circumstances, re-identification is impractical. An alternative approach to improving demographic prediction is needed.

Williams et. al. (2004) describe a system used by Dstillery for generating high-intarget, high reach segments using Oracle data. Segments—or sets of web users—have utility in online advertising because it is possible for advertisers to purchase segments as part of their advertising campaign—a third party company maintains a list of users, and are called to determine if a user is part of the segment—if it is, the third party company returns that the user is part of the segment. Dstillery developed these segments by converting Oracle data into a set of repeated, duplicate request rows with static binary in-target results. Dstillery creates duplicates of the same request—for example, if property X has demographic probability is 0.6, then they may generate 6,000 duplicate requests for X with probability 1 and another 4,000 with probability 0. Dstillery then appears to have performed logistic regression on the generated data set to predict in-target probability. Finally Dstillery defined a new engineered segment to comprise all request cases such that Pr(Class=k|X)>delta. The delta parameter was then varied in order to achieve segments with different combinations of in-target probability and reach. There are several differences between Dstillery's work and the inventive concepts described in this disclosure: (1) Dstillery's system creates segments—groups of users—who can then be targeted in the future, if those users are encountered again. In contract, some embodiments of the invention described herein are designed to predict the in-target probability for individual web requests. (2) Some embodiments of the present invention describe mechanisms for cleaning audit results, eliminating spurious audit results, weighting those audit results by their expected reliability (using a concept that we call "disagreement"). (3) Dstillery assigns audit class labels to individual web requests by generating repeated (redundant) copies of requests with a binary classification to represent the label probabilities. In contrast, the present invention has a significant computational complexity advantage since it is designed to natively work with probabilistic labels. This advancement is significant as it leads to tens of thousands of times lower memory requirements and time complexity compared to the approach of duplicating records with binary classifications and applying a machine learning model (e.g. logistic regression) on a large data set. (4) Dstillery does not describe algorithms or methodologies for determining which properties to submit for audit so as to increase prediction accuracy; in contrast, the present invention describes well-described mechanisms for generating new demographic audit batches—determining what properties to select for auditing, (5) Dstillery does not describe methods for measuring the accuracy of each algorithm. In their paper, they use a data set with known request level demographics and so can use their request-level ground truth to show lift since they know the ground truth. The present invention is designed to work in a production system that only has access to Oracle data. To this end, some embodiments of the invention use "algorithm audits" to measure accuracy using Oracle data. Methods for accuracy measurement are useful where the request-level demographic ground truth is not known, such as in production when only Oracle audits are available. (6) There are many other features that are described in the current invention that are not described in prior work including (a) Combining Oracle prediction with request-level predictions, (b) Algorithm audit feedback for improving algorithm performance, (c) Measurement of third party segments, (d) Methods for filtering segments to increase predictive performance, and so on.

Demographic Predictor Overview

This invention uses aggregate data from a measurement company, also known as a ratings company or an Oracle, to predict demographics of individual web requests. Several aspects of the invention are illustrated in FIGS. 2 and 3, but the following provides more detailed information about various aspects and embodiments of the invention.

Most other applications that predict demographics, use request-level, labeled data to train a machine learning to predict. The problem for this invention is very different because the Oracle data is aggregated into large batches (FIG. 4). This presents two key problems:

First, how should traffic be combined into batches to be audited by the Oracle, so as to gather data that can then be used for prediction? Ideally, the traffic batch created would enable the highest gains in information and accuracy from the system. For example, is it better to create a batch of traffic sampled as all having a particular hour of day, or is it better to create a batch of traffic based on using a particular browser such as "Internet Explorer 6".

Second, once some audits are available, how should the various audits be combined to predict the demographics of an incoming request? For example, we might have data on a 10,000 batch of traffic sampled for website="cnn.com" indicating that the demographics are older and male. We also might have data on a 10,000 batch of traffic sampled from BlueKai "interest in Scifi" that indicates that the demographics are middle-aged male. We might also have data from a 10,000 batch of traffic for web traffic that is using "Internet Explorer 6" browser, indicating that the traffic is "older and female". We might have hundreds of additional properties of the request, that have been "audited" with Oracle demographics.

This invention describes (a) how to combine these sources of data to predict web requests, (b) how to create batches of traffic that enable the highest gains in accuracy from the system, and (c) how to measure the system.

Demographic Prediction Problem: Inputs and Outputs

The demographic prediction problem can be described in part by its inputs and outputs.

1. Inputs:

The inputs include a set of web requests of size N; each web request having properties $x_{ij}$=(0,1). The following Table 1 is an example of web request inputs to the demographic predictor. Each of the fields are populated from the HTTP request headers, query parameters, or are lookups. For example, continent, country, metro, zip are created by performing a look-up on the IP address. Player_size indicates the size of the video player that is requesting the ad. Browser and OS are enumerations of different useragent strings.

TABLE 1

| Field Number | Variable Name | Example Value |
|---|---|---|
| 1 | Ip | 1234567899 |
| 2 | x_forward_for | 1795421966 |
| 3 | server_time | 1439708400 |
| 4 | user_time | 1439690400 |
| 5 | Continent | 43 |
| 6 | Country | 228 |
| 7 | Region | 803 |
| 8 | City | 805 |
| 9 | metro | 802 |
| 10 | Zip | 6406 |
| 11 | Uid | 123456789 |
| 12 | event | adAttempt |
| 13 | inv_id | 0 |
| 14 | ad_id | 408390 |
| 15 | es_id | 116146684 |
| 16 | page_url | |
| 17 | video_url | |
| 18 | creative_id | 218213 |
| 19 | provider_id | 2, 24, 31, 201, 207, 222, 272, 519, 520, 636, 663, 690, 745 |
| 20 | segment_id | 273, 281, 282, 284, 355, 366, 369, 392, 393, 397, 399, 400, 401 |
| 21 | Os | 10 |
| 22 | browser | 11 |
| 23 | cookie_age | 1435732547 |
| 24 | domain | website.com |
| 25 | click_x | −1 |
| 26 | click_y | −1 |
| 27 | market_place_id | 0 |
| 28 | viewable | 0 |
| 29 | player_size | 1 |
| 30 | active | 0 |
| 31 | Rsa | 9 |
| 32 | platform_device_id | 0 |
| 33 | language_id | −1 |
| 34 | Bid | −1 |
| 35 | second_bid | −1 |
| 36 | Mrp | −1 |
| 37 | carrier_mcc_mnc | 0 |
| 38 | creative_wrapper | −1 |
| 39 | is_https | −1 |
| 40 | rid | 0391a735-464e-4ef6-b7e0-23580efd1160 |

2. Outputs:

The output is a prediction of the demographics of the input web request. Typically, this prediction is a represented as a predicted probability for the incoming traffic across a range of available demographic IDs. Table 2 is an example of output where the predicted probability is across each of 24 demographics listed:

TABLE 2

| demoid | Pr |
|---|---|
| 1003 | 0.342553 |
| 1004 | 0.147047 |
| 1005 | 0.03775 |
| 1006 | 0.017567 |
| 1007 | 0.016867 |
| 1008 | 0.024014 |
| 1009 | 0.025002 |
| 1010 | 0.017856 |
| 1011 | 0.01349 |
| 1012 | 0.007146 |
| 2003 | 0.176106 |
| 2004 | 0.075027 |
| 2005 | 0.029224 |
| 2006 | 0.011636 |
| 2007 | 0.00867 |
| 2008 | 0.010091 |
| 2009 | 0.015549 |
| 2010 | 0.008897 |

TABLE 2-continued

| demoid | Pr |
|---|---|
| 2011 | 0.010545 |
| 2012 | 0.004963 |

The example output from the demographic predictor in Table 2 provides a probability for each of 24 demographics (coded 1003 through 1012 and 2003 through 2012). The human readable demographic names for each demoid are shown in Table 3, below. Thus, for the example shown in Table 2 the output of the demo predictor estimates that the web request has a 7.5% chance of being Male 21 to 24, and a 17.6% chance of being Male 18 to 20. Therefore, the most likely demographic is actually Male 18 to 20.

TABLE 3

| demoid | id | gender | Agestart | ageend | Descript |
|---|---|---|---|---|---|
| 1001 | 1 | F | 2 | 11 | FEMALE 2-11 |
| 1002 | 2 | F | 12 | 17 | FEMALE 12-17 |
| 1003 | 3 | F | 18 | 20 | FEMALE 18-20 |
| 1004 | 4 | F | 21 | 24 | FEMALE 21-24 |
| 1005 | 5 | F | 25 | 29 | FEMALE 25-29 |
| 1006 | 6 | F | 30 | 34 | FEMALE 30-34 |
| 1007 | 7 | F | 35 | 39 | FEMALE 35-39 |
| 1008 | 8 | F | 40 | 44 | FEMALE 40-44 |
| 1009 | 9 | F | 45 | 49 | FEMALE 45-49 |
| 1010 | 10 | F | 50 | 54 | FEMALE 50-54 |
| 1011 | 11 | F | 55 | 64 | FEMALE 55-64 |
| 1012 | 12 | F | 65 | 999 | FEMALE 65+ |
| 2001 | 14 | M | 2 | 11 | MALE 2-11 |
| 2002 | 15 | M | 12 | 17 | MALE 12-17 |
| 2003 | 16 | M | 18 | 20 | MALE 18-20 |
| 2004 | 17 | M | 21 | 24 | MALE 21-24 |
| 2005 | 18 | M | 25 | 29 | MALE 25-29 |
| 2006 | 19 | M | 30 | 34 | MALE 30-34 |
| 2007 | 20 | M | 35 | 39 | MALE 35-39 |
| 2008 | 21 | M | 40 | 44 | MALE 40-44 |
| 2009 | 22 | M | 45 | 49 | MALE 45-49 |
| 2010 | 23 | M | 50 | 54 | MALE 50-54 |
| 2011 | 24 | M | 55 | 64 | MALE 55-64 |
| 2012 | 25 | M | 65 | 999 | MALE 65+ |

While the demographic information in Table 3 is illustrative of gender and age demographics (e.g. "Females 18 to 24" etc.), the invention is not specifically limited to these particular demographics. Other types of demographics also could be supported. For example, the present invention could have outputs with demographics such as hobbies or interests e.g., "interest in scifi magazines", "propensity of the traffic to have an installed application," or any other traits of interest in the web traffic—as long as the Oracle provided this information as part of their "audit".

In-Target Calculation and Actions by Content Provider

Given an incoming web request, and a content provider who has specified their desired demographics, the predicted in-target rate for that content provider, for this web request, is calculated as follows:
1. Execute the demographic predictor on the web-request x to generate predictions for $d_i$ demographics.
2. The content provider's desired demographics D are a set of demographic indexes that they wish to target. The desired demographics are usually stored in a database table, and loaded into to the system and held in memory for real-time execution.
3. Sum the probabilities for demographics that match the content provider's desired set. In practice we typically sum the desired demographic probabilities, and then divide by the sum of all probabilities. It is possible that the predictions sum to 1, and that the denominator may not be necessary, but depending upon the algorithm used, there can be imperfections in the predictions and so this is a useful safety measure to divide by the total of the predictions.

$$ITR(x) = \frac{\sum_{i \in D} Pr(d_i \mid x)}{\sum_j Pr(d_j \mid x)}$$

The resulting In-target Rate (ITR) is the probability that the incoming request is a match to the demographics that the Content provider is looking for. The Content Provider may now increase the bid on their ad, or they may adjust the content being displayed on the web-page so that it is appropriate for the demographic viewing the web-page.

Demographic Predictor Architecture

FIG. 1 is an illustration that generally describes demographic predictor architecture. When a web request is received from a user, the web request properties are provided to a demo predictor that returns predicted demographics of the user. Over time, several web requests may be selected, labeled (step A), and sent to an Oracle (step B). The Oracle returns audit data (step C) that can then be used in the demo predictor to predict demographics of future web requests that are received.

Demographic Providers

A Demographic Provider is an entity that provides information about demographics. Demographic Providers may be derive their information from audits (i.e., where an Oracle provides the demographic information), where-as others may not require a lookup with the Oracle. Both types are described below.

1. Audit Demographic Providers

A "Demographic Provider" or "Indicator Type" often is the result of auditing particular web requests. This is a source-of-information about the demographic distribution of particular digital assets, including sites, segments, userIDs, IPs, browser, time of day, operating system, zipcode, week of year and other properties of the web request. Demographic Providers do not need to be perfectly accurate. The relative accuracy, and utility of Demographic Providers will be determined during model training.

Commonly an Indicator may also represent a label for an arbitrary batch of traffic that is "audited" or assessed by a third party company. The third party reports back on the aggregate traits of the batch of traffic.

The following Table 4 is an example of audit results that might be obtained for Indicators from Nielsen:

TABLE 4

| indicator_id | demo_id | probability | updated_at |
|---|---|---|---|
| 33 | 1000 | 0.0120254 | 2015 Jun. 22 12:46:09 |
| 33 | 1001 | 0 | 2015 Jun. 22 12:46:09 |
| 33 | 1002 | 0 | 2015 Jun. 22 12:46:09 |
| 33 | 1003 | 0.0172936 | 2015 Jun. 22 12:46:09 |
| 33 | 1004 | 0.0240348 | 2015 Jun. 22 12:46:09 |
| 33 | 1005 | 0.0588782 | 2015 Jun. 22 12:46:09 |
| 33 | 1006 | 0.0461322 | 2015 Jun. 22 12:46:09 |
| 33 | 1007 | 0.0276217 | 2015 Jun. 22 12:46:09 |
| 33 | 1008 | 0.0312725 | 2015 Jun. 22 12:46:09 |
| 33 | 1009 | 0.026805 | 2015 Jun. 22 12:46:09 |

Some example Indicator types commonly used by the system, and their cardinalities, are illustrated in Table 5.

TABLE 5

| Indicator_type | Count |
|---|---|
| DOMAIN | 13860 |
| SEGMENT | 1462 |
| ZIP_CODE | 9744 |

Some examples of indicators are shown in Table 6 below, where the Sample_OCR_Rate=1-requests out of 10,000,000 that are audited. It should be noted that multiple indicator_types can be stored in the same table. This is an efficient method for storage and manipulation. It means that other generalized indicators/labels/batches can be constructed and sent for audit.

TABLE 6

| id | name | indicator_type | audit_type | sample_rate_ocr | sample_rate_vce | updated_at |
|---|---|---|---|---|---|---|
| 3 | viewster.com | DOMAIN | GENERAL-UK | 10000000 | 0 | 2015-06-20 12:42:12 |
| 10 | ibtimes.com | DOMAIN | GENERAL-UK | 10000000 | 0 | 2015-06-23 12:34:13 |
| 12 | ustream.tv | DOMAIN | GENERAL-UK | 10000000 | 0 | 2015-06-23 12:34:13 |
| 20 | dramafever.com | DOMAIN | GENERAL-UK | 10000000 | 0 | 2015-06-23 12:34:13 |
| 21 | natureworldnews.com | DOMAIN | GENERAL-UK | 0 | 0 | 2014-04-16 12:37:45 |
| 22 | bossip.com | DOMAIN | GENERAL-UK | 3902389 | 0 | 2015-06-23 12:34:13 |
| 29 | medicaldaily.com | DOMAIN | GENERAL-UK | 10000000 | 0 | 2015-06-19 12:43:00 |
| 32 | einthusan.com | DOMAIN | GENERAL-UK | 3451443 | 0 | 2015-06-23 12:34:13 |
| 33 | photobucket.com | DOMAIN | GENERAL-UK | 2186 | 0 | 2015-06-23 12:34:13 |
| 34 | newsinc.com | DOMAIN | GENERAL-UK | 10000000 | 0 | 2015-06-22 12:46:11 |

It should be noted that missing values are expected: Not every User, IP, Domain, Segment needs to have a demographic prediction stored in Table 6, above. If there is low confidence for an indicator value, then it is not written to the table, so as to avoid the memory cost.

2. Non-Audit Demographic Providers

Other types of Demographic Providers do not need to capture their information directly from an Oracle/Nielsen/Comscore/Third Party audit, but instead can obtain their data from other sources—or from other aggregated sources of audit data. Below are some examples:

A. Non-Audit Demographic Provider Example 1: Domain Similarity to Previously Audited Domains In this example, let's assume that there are approximately 20,000 web site domains (such as "cnn.com", "fashionista.com", etc.) that are served ads per week and that we already audit results for about 8,000 of the site domains (e.g., "fashionista.com" might already have Oracle demographics and was audited). How do we predict domain results for the other 12,000? One method is to create a predictor that uses the demographic information from the 8,000, calculates similarity, then estimates the demo distribution for those others. The estimation method can vary—e.g. co-navigation, keyword-similarity. Below is an illustration of the steps that could be used to accomplish this estimation:

STEP 1: Extract all keywords on each of the domains by crawling (accessing websites and extracting the keywords on the site). For each domain create a domain-keyword occurrence rate, and divide by total words to create a keyword probability for each keyword on each domain.

STEP 2: Create a natural occurrence rate for each keyword, which comprises keyword and probability of occurrence in natural corpora. This can be done in one of two ways: (a) Use a Natural corpus (for example crawl the freely available Project Gutenberg archive) to create a natural keyword-occurrence rate, and divide by total words in the natural corpus to create a word probability, or (b) collect natural occurrence rates by using research corpora tools such as WordNet which maintain keyword, probability statistics.

STEP 3: For each domain, for each keyword, divide the probability of occurrence of the keyword on the domain by the natural probability of keyword to create a lift score. Each domain now has a keyword lift vector.

STEP 4: For each domain i and for each domain j, calculate the correlation between the lift vectors. If a keyword does not match between domain i and domain j, a missing value is imputed.

STEP 5: Given a domain i where the demographics are unknown, find the most similar N domains based on keyword vector correlation, which do have demographics from previously conducted audits.

STEP 6: Impute the estimated demographics of the domain i by taking a weighted average of the N similar domains.

As an example, the following Table 7 illustrates keywords extracted from "style.com", "stylesense.tv", "livinghealthylifestyles.com", "theguardsman.com" and their correlation scores shown in Table 8. The keyword frequency for "style.com" (a women's fashion website) is similar to "stylesense.tv" (also a women's fashion website), and less similar to "livinghealthlifestyles.com" (health orientated website) and very dissimilar to "theguardsman.com" (an army national guard websites).

TABLE 7

| keyword | Occ | natural occ | prob occ | prob occ natural | Style.com lift | stylesense.tv lift | Livinghealthylifestyles.com lift | Theguardsman.com lift |
|---|---|---|---|---|---|---|---|---|
| shows | 10395 | 34 | 0.007791 | 3.09E−05 | 252.25 | | 4.51249 | |
| fashion | 10055 | 36 | 0.007536 | 3.27E−05 | 230.44 | 240.917 | 1.420599 | 53.88262 |
| display | 3003 | 14 | 0.002251 | 1.27E−05 | 176.98 | | | 69.27766 |
| latest | 4191 | 21 | 0.003141 | 1.91E−05 | 164.66 | 51.62507 | | |
| spring | 15444 | 86 | 0.011575 | 7.81E−05 | 148.17 | 12.60612 | 1.387562 | |

TABLE 7-continued

| keyword | Occ | natural occ | prob occ | prob occ natural | Style.com lift | stylesense.tv lift | Livinghealthylifestyles.com lift | Theguardsman.com lift |
|---|---|---|---|---|---|---|---|---|
| saint | 2101 | 12 | 0.001575 | 1.09E−05 | 144.45 | | 1.420599 | |
| map | 3161 | 19 | 0.002369 | 1.73E−05 | 137.26 | | | |
| guide | 3251 | 20 | 0.002437 | 1.82E−05 | 134.11 | | | |
| style | 7745 | 51 | 0.005805 | 4.63E−05 | 125.30 | 63.77214 | | |

TABLE 8

| style.com vs | stylesense.tv | livinghealthylifestyles.com | theguardsman.com | army.com |
|---|---|---|---|---|
| corr | 0.244995 | 0.013223 | 0.091945 | 0.110642 |
| log-corr | 0.508588 | 0.373827 | 0.527184 | 0.531198 |
| corr positive | 0.581773 | −0.04175 | −0.0806 | 0.073836 |

Using the information in Tables 7 and 8 above, we can impute the estimated demographics for "styleblazer.com" by taking a weighted average of the N similar domains. For example, the following Table 9 is the predicted demographic profile for "styleblazer.com" using similar sites.

TABLE 9 nameA: styleblazer.com

| Demographicname | Values | | | |
|---|---|---|---|---|
| | pct predicted | pct | zscore predicted | zscore |
| AdultAgeRangesPresentinHouseholdFemales18-24 | 0.06 | 0.12 | 0.70 | 0.49 |
| AdultAgeRangesPresentinHouseholdFemales25-34 | 0.11 | 0.26 | 2.65 | 3.30 |
| AdultAgeRangesPresentinHouseholdFemales35-44 | 0.06 | 0.19 | 1.68 | 3.26 |
| AdultAgeRangesPresentinHouseholdFemales45-54 | 0.04 | 0.09 | 0.03 | 0.52 |
| AdultAgeRangesPresentinHouseholdFemales55-64 | 0.02 | 0.04 | (0.31) | (0.48) |
| AdultAgeRangesPresentinHouseholdFemales65-74 | 0.01 | 0.02 | (0.32) | (0.55) |
| AdultAgeRangesPresentinHouseholdMales18-24 | 0.03 | 0.03 | (0.37) | (0.63) |
| AdultAgeRangesPresentinHouseholdMales25-34 | 0.05 | 0.09 | (0.47) | (0.73) |
| AdultAgeRangesPresentinHouseholdMales35-44 | 0.04 | 0.08 | (0.67) | (0.59) |
| AdultAgeRangesPresentinHouseholdMales45-54 | 0.03 | 0.05 | (1.05) | (1.19) |
| AdultAgeRangesPresentinHouseholdMales55-64 | 0.02 | 0.02 | (0.91) | (1.11) |
| AdultAgeRangesPresentinHouseholdMales65-74 | 0.01 | 0.01 | (0.57) | (0.99) |

B. Non-Audit Demographic Provider Example 2: UserID Demographics Model

Another Demographic Provider which doesn't use audit information, is a database table of users and their demographics. Each of the users is represented by a UserID, and these users may have self-declared their age and gender e.g., by filling out their profile on a website. These ages and genders are stored in the database table also. When we encounter a web request from this UserID, we can now lookup this database table and access the user's age and gender. The self-declared age and gender information can be weighted with other information that we know about the web request (eg. the audit results for the site, etc) to come up with a final prediction for demographics.

The Demographic Prediction Model

The demographic model is designed to predict the demographics of the traffic using previously captured audit information. It does this by using both Oracle audits as well as other sources of information that are available at the time of prediction. We will first introduce the Demographic Prediction Model—the formula that is executed to predict demographics. We will then describe the training process for the model.

1. Demographic Prediction Model Definition

Let $X=(X_A \ldots X_N)$ be an ordered pair of audit batches, each of which is batched by collecting together all web requests having properties A . . . N. Thus, $X_A$ is a labeled batch of traffic for audit A with demographic probability distribution reported by the Oracle equal to $Pr(d_j|X_A)$. The audited demographics for the audit batches X are given by an ordered pair $Y=(Y_A \ldots Y_N)$. Let $\in X_A$; $x=(x_1 \ldots x_M)$ be an individual traffic request from batch $X_A$ with properties $x_1 \ldots x_M$. Each property $x_i \in \{0,1\}$ is a 0-1 variable. The properties of the request could include browser, time of day, website from which the request is being made, and third party information about the cookie, and other HTTP headers. The present invention predicts the probability of a demographic for a new request x using historical audit information.

Our problem is to predict the probability of a demographic for a new request $x_i$:

$$Pr(d_j|x) = f(w_{j,1 \ldots N}, x_{1 \ldots N})$$

The technical challenge of the above problem is that the labels for all of the requests are aggregated; we know the audited batch probability $Pr(d_j|X_A)$; we do not know the individual requests within the audit $Pr(d_j|x \in X_A)$. Batches may encompass 10,000 requests or more, so it is hard to tell which underlying users have what demographic traits.

FIG. 4 shows how this problem is different from a standard machine learning problem. In a standard machine learning problem we have a set of web requests with a set of properties (eg. time of day, browser etc), and known demographics (eg. age-gender), and we can divide them into training and hold-out set, and then predict the dependent variable directly discover a mapping from features to demographics. In this "aggregated Oracle problem", we only get to see aggregated batches of underlying web requests. The aggregated batch is likely to not even to have properties that are known for certain—nor a label which is known for certain. For example, the batch may have properties of Pr(Browser="Internet Explorer 8")=0.2; Pr(HourOfDay="4 am")=0.1; etc. The labels are also probabilistic, eg. Pr(Male18to24)=0.2; Pr(Male25to34)=0.1, and so on. In order to train a model that will predict using this aggregated data, we re-cast the problem from a problem in "request space" with known predictors to one in "audit space" using probabilistic predictors. We now have:

$$Pr(d_j|x \in X_A) = f(w_{ji}, Pr(x_i|x \in X_A))$$

Each $Pr(x_i)$ is the probability of the property being present.

Later we will show that under this formulation, we can de-compose the problem into a problem with a probability matrix (representing the occurrence rate of these properties) multiplied by the feature matrix. This de-composition enables much faster computation of the model, since the probability matrix can be computed independently using a one pass operation.

The demographic prediction is able to make use of several types of features that we have available. We describe these types here:

A. 0-1 Web Request Predicates

The specific $x_i$ predicates available can include predicates based on IP, CookieID, Zipcode, Browser, Time of day, WebSiteOriginatingRequest and so on. For example, we might have a feature Pr(Browser=Safari). We will refer to these properties of the request as "web request predicates". These represent the presence or absence of certain properties. In a an audit batch, these become probabilistic variables, eg. the probability of Browser being Internet Explorer 8 in a batch of traffic that has property of site="cnn.com" may be 12%.

B. Demographic Providers/Indicators

The above features represent probabilities of presence/absence of properties in the request. We can also include probability distributions for predicates which themselves have been the subject of Oracle audits in the past. In other words, we can retrieve the demographic audit results for a particular 0-1 Web Request predicate, if we have audited that 0-1 Web Request predicate in the past. For example, let's say that we have audited websites previously such as "cnn.com", "fashionista.com" and so on. When we receive a new request from "fashionista.com", we can now lookup the historical demographic audit for "fashionista.com", and add that to our prediction features. This effectively adds the following additional $Pr(d_j|x_i)$ term to our features:

$$Pr(d_j|x \in X_A) = f(w_{ji}, Pr(x_i|x \in X_A), Pr(d_j|x_i))$$

C. Segments

In addition to the above, it is possible to request information from Data Service Companies about what they know about the user. These data service companies may include Datalogix, Experian, IRI, Webbula, VisualDNA, iBehavior, Relevate, BlueKai, and a host of other companies. Data service companies generally do not batch their data in the same way that Oracles do, but instead allow for direct subscription to their data and provide attributes at the user level. We will add "segments" $s_i$ to our features as below:

$$Pr(d_j|x) = f(w_{ji}, Pr(x_i|x \in X_A), Pr(d_j|x_i), Pr(s_i|x \in X_A), Pr(d_j|s_i))$$

A segment literally represents a group of people who have a particular trait, as reported/inferred by the data service. For example, a user may be tagged by BlueKai as having "income=50K to 60K", or VisualDNA "age=18 to 29", or Experian "interest=scifi", and so on.

Each of these "segments" is a predicate that could help us to predict the demographics of the request. For example, we would expect that if BlueKai believes that the user is aged 18 to20, then this would increase the chances that the user would also be determined by the Oracle to be aged 18 to20. We would also note that although these Data Service companies may well flag the demographics of the user, as they see it, their assessments may not match that of the Oracle. Because of the particular biases that these companies encounter, they may well be correlated or even anti-correlated with the Oracle. Thus an algorithm is needed that can incorporate this segment information, and which is robust to the invariable data quality or weak correlation issues with the Oracle. We describe an algorithm that addresses these data issues over the proceeding sections.

D. Non-Audit Demographic Providers

Finally, we may include non-audit demographic provider information. For example, if the user who is making the request, is a user who has previously self-identified their age-gender, then we can use that known age-gender and add it to our features for training and evaluation.

Similarly, if there is no information known about the particular referring website (e.g., "fashionmaven.com"), but we know that the keywords on this site are similar to the keywords on "fashionista.com" and we have audit results for "fashionista.com", we can add an estimate for demographics for "fashionmaven.com" to our prediction vector.

We will add this as a probability of demographic given non-audit information n.

$$Pr(d_j|x) = f(w_{ji}, Pr(x_i|x \in X_A), Pr(d_j|x_i), Pr(s_i|x \in X_A), Pr(d_j|s_i), Pr(d_j|n_i))$$

Demographic Prediction Model: Feature Selection

The number of potential features in the above model is large. We can reduce the cardinality of features by applying some filters as described below:

1. Use Features for Site, Segment, Zip-code:

One embodiment of the invention uses a set of indicator types or demographic providers that are known to be effective for demographic prediction. These include
  (a) Site (the domain, such as fashionista.com),
  (b) Zip-code or Postal code,
  (c) Segment (ie. a 0-1 categorization provided by third parties such as BlueKai, Datalogix, and others.

In-particular, segments that are identified as specific demographics that we are trying to predict (eg. BlueKai-Male-18to24, Datalogix-Female-65Plus), are useful for prediction.

The cardinality is fairly low on these properties in particular, and they tend to be quite predictive. Therefore these can be a very effective embodiment.

2. Use Features such that the probability of expression in audit batches, is correlated with the demographic of interest in the batch:

One embodiment is to use an automated process to "mine" for predictive properties. This is done as follows:
  (a) Given a set of previously audited batches, calculate the correlation coefficient between the probability of expression of a property within each batch, and the demographic for that batch.

(b) Select the top N properties with the highest positive and negative correlation coefficient.
(c) Audit these N properties. For traffic having the property in question, sending it to the Oracle to be audited for demographics.
(d) Use the demographic audit results for these new batches 3. Perform Quality Analysis on Purported Demographic Segments:
  Find Demographic segments that are identified with the demographic being predicted, (eg. BlueKai-Male18to24 when the demographic that is of interest to be predicted is Male18to24), and then inspect thei audit results for that segment. If the audit results for the named demographic segment do not match the named demographic, then discard the segment.
  2. Filter Out Properties with Low Amounts of Site Coverage We have discussed that there are a large number of potential web request predicates and demographic providers that can be used for prediction of demographics. However not all of these properties are equally useful. In practice we have found that rarely expressed properties are often spurious. We refer to these sometimes as "sucker fish"—properties that occur on very few cases, but which could easily become correlated with a probabilistic label by chance, and then get "stuck" with the training algorithm selecting them at high rates. They also happen to be numerous. Without steps to address these spurious features, the cardinality of these properties can overwhelm the learning algorithm with bad data, resulting in a complex model and poor generalization performance. Spurious variable associations have been noted by a variety of authors to be a problem with particularly large data sets (Anderson, et. al., 2001; Fan, 2014; Fan and Liang, 2014).

Figure 9:
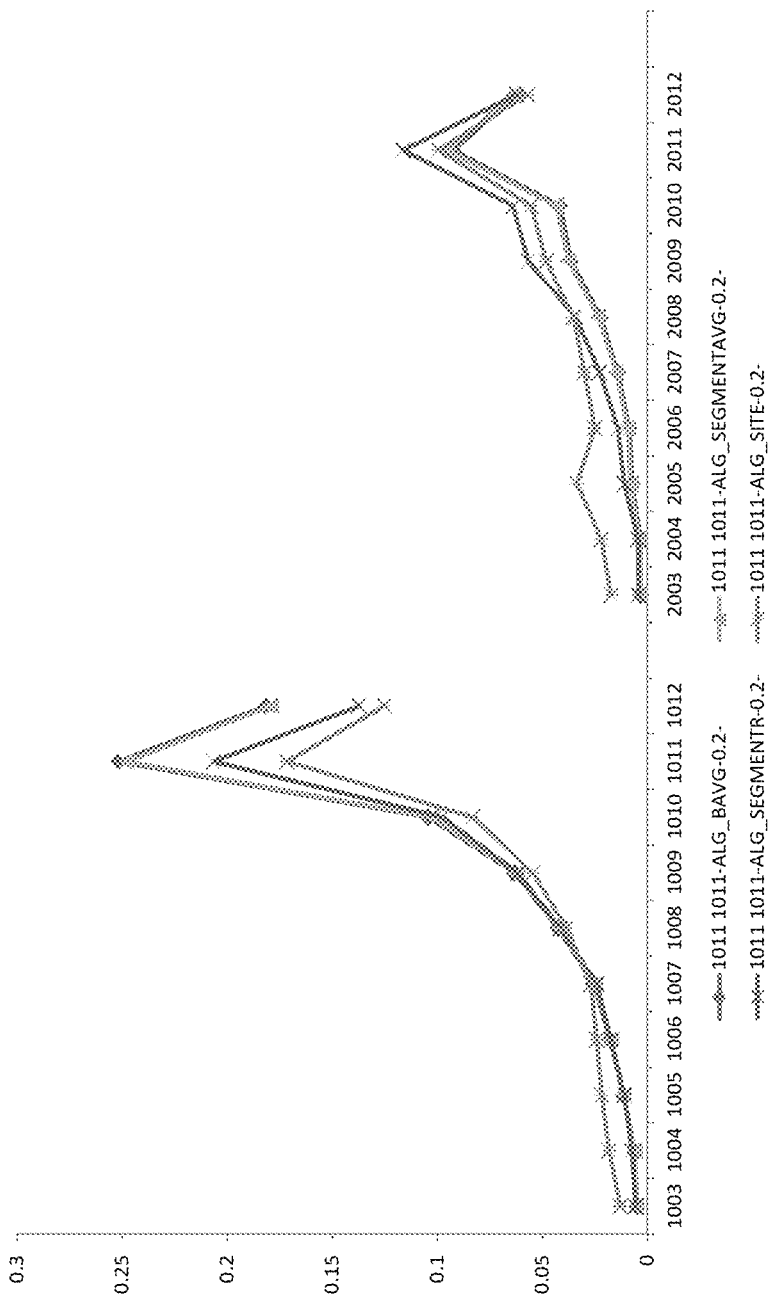

One way to address this problem is to have a threshold for the number of sites on which the property was expressed before it is used. Thus we restricted the features under consideration to those that had been expressed on a sufficiently large amount of data—for example, we've found that a property that appears on 5% or more of unique sites tends to be reliable enough to use for prediction. Requiring a minimum amount of "participation" on different sites, means that the property has to "lay down a substantial number of bets" about the demographics that it is auditing—so if it is found to be predictive, it is unlikely that result was achieved by chance. For example, say that the web request property is a segment called "BlueKai Male18to24" meaning that BlueKai has flagged the user as being "male 18 to 24". We then observe this segment on more than 5% of the sites to which we serve ads. If the property receives an Oracle audit of "male 18 to24=70%", then because the segment was "expressed" on so many sites, it is unlikely we could have obtained this audit result by chance. Conversely, a similar segment that occurs on just 1 or 2 sites, could easily get a high Oracle audit (e.g., 100%) and this may be due to the particular characteristics of the site. If we were to observe the segment on more sites we may find that the Oracle audit results varies significantly and might drop to only 5%. The impact of adding this minimum threshold, if chosen correctly, can be fairly significant: FIG. 9 shows an automated parameter search on the minimum site threshold parameter. As the minimum threshold is increased for the minimum number of sites, the hold-out set correlation of those features increases. This automated parameter search enables us to set the minimum site participation threshold to 5%.

Figure 5:
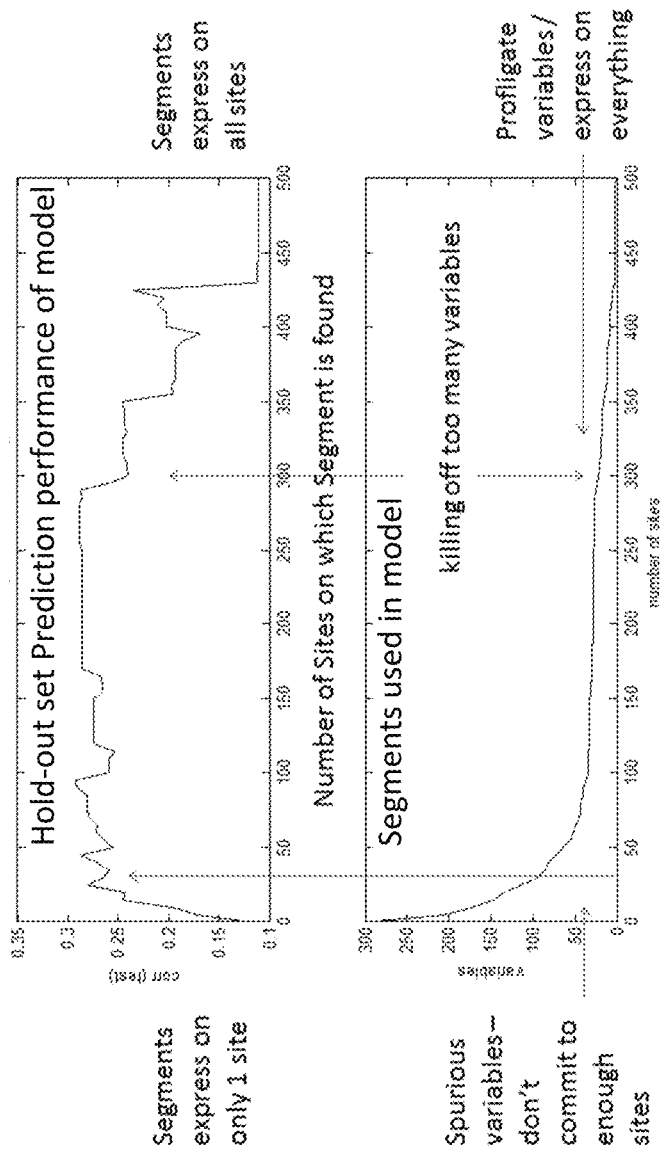
FIGS. 5 and 6 are illustrations of prediction accuracy for some embodiments of the disclosure.
Figure 6:
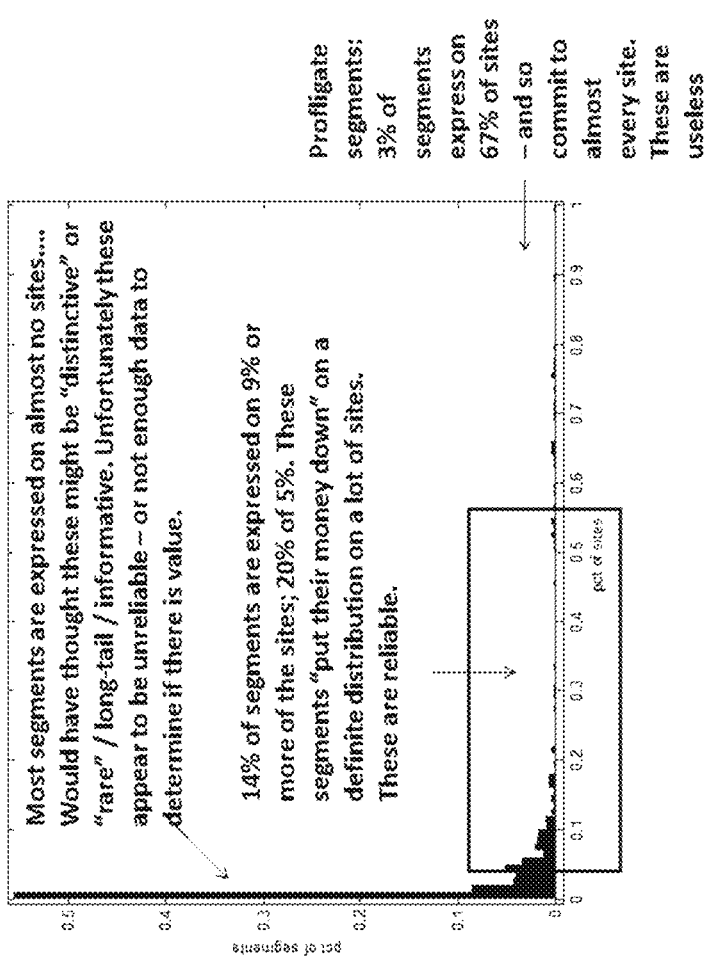

Properties that are present on too many sites (e.g. 70% of sites or more) are also are not predictive (FIG. 5). The intuition here is that if a property occurs on every impression, then essentially its information content is minimum—it doesn't tell us anything that we can use to discriminate one web request's demographics from another. Using our automated parameter search again (FIG. 5) we can see that if a property is found on 70% or more of sites then it becomes unpredictive.

Figure 7:
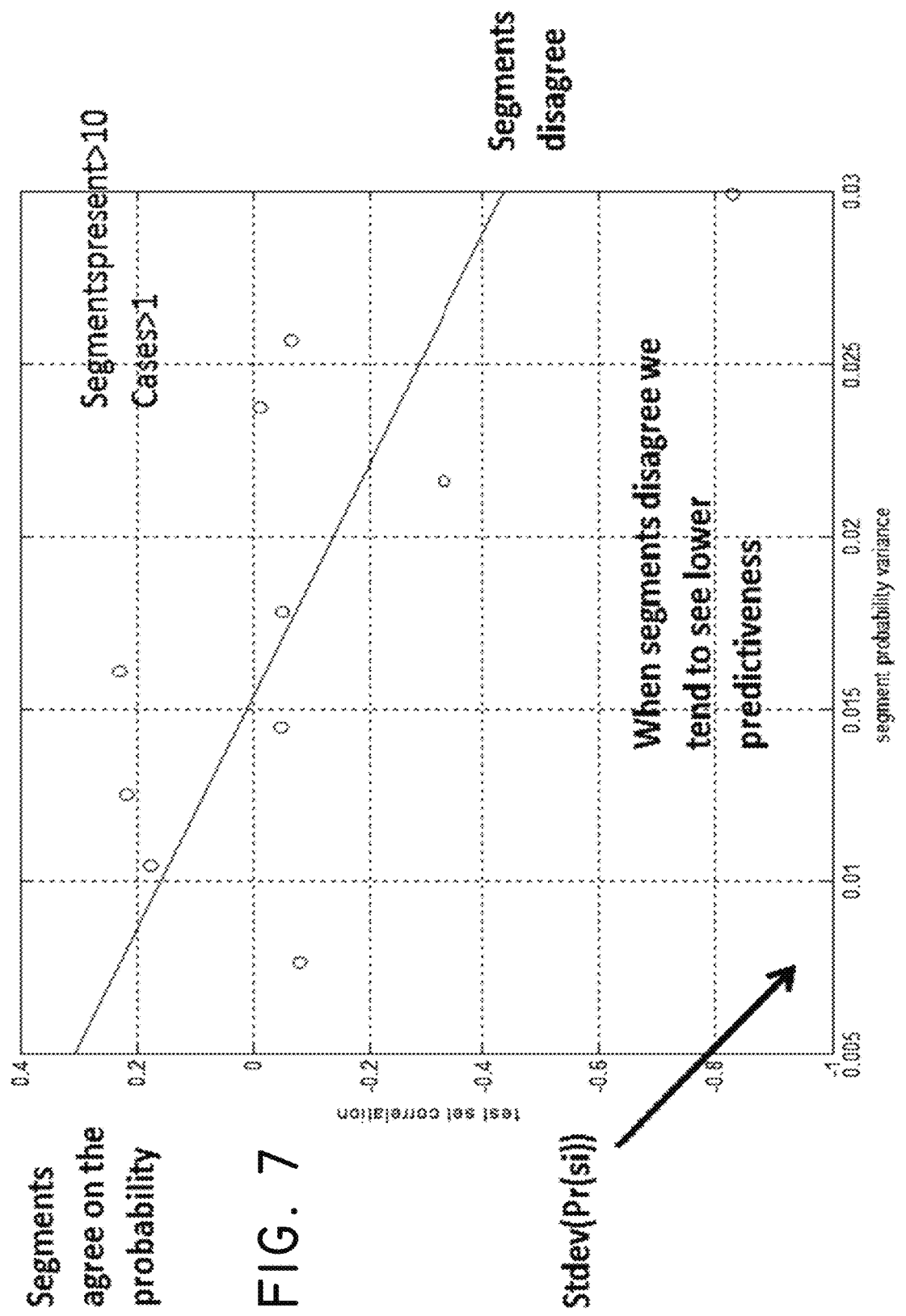
FIG. 7 is an illustration of a standard deviation for audit probability in accordance with some implementations of the disclosure.

FIG. 7 is an illustrative example of a distribution showing the percentage of web request properties that are expressed on 1 site, 2 sites, 3 sites, etc. FIG. 7 illustrates this data as a percentage, but it may also be expressed in different ways, such as by defining the vertical axis by the number of common properties. In the example shown in FIG. 7, there is a large percentage of web request properties that are only found on 1 site. These web request properties are quite unreliable and we tend to filter them out. In addition, there are web request properties that are found on 50% or more of sites. These properties effectively carry little information about the traffic, and so these also have low predictive power and we tend to filter those out.

The large spike at 0 in the graph of FIG. 7 shows a large number of "suckerfish" features—features expressed on very few websites, where very high and low correlations could occur at random and cause these features to be selected during training. The most useful predictors are the small clump to the right of that spike which were expressed on 5% or more of the sites.

3. Use User-Predictor Agreement to Determine how Much to Weight User-Attributes Versus Site Attributes:

When there were multiple segments and the audits for those segments all tended to agree, then prediction using the average of segments tends to have good hold out set performance. If, on the other hand, there are multiple segments and their audits disagree, then it tends to indicate that the user/computer has mixed behavior and is hard to predict. In these situations, using the site is much more predictive.

Figure 8:
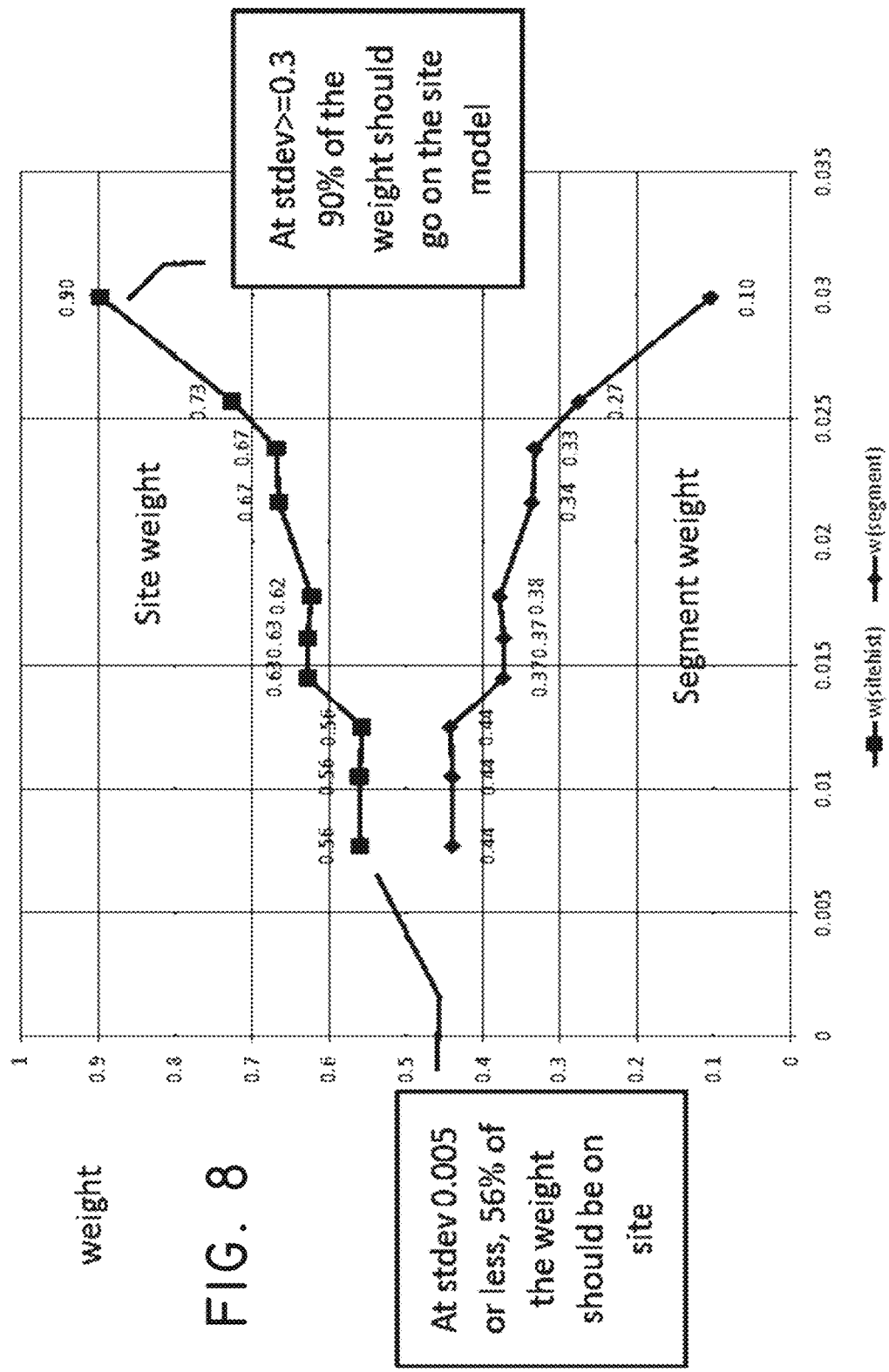
FIG. 8 is an illustration of disagreement amongst segments in accordance with some implementations of the disclosure.

As illustrated in FIG. 8, "disagreement" between the properties can be measured by the standard deviation of audit probabilities:

$$D(x) = \sqrt{\frac{1}{N} \sum_{X_A} (Pr(d_j | x \in X_A) - E[Pr(d_j | x \in X_A)])^2}$$

FIG. 8 shows an example of the standard deviation for audit probability from a set of segments on incoming request (x-axis) versus hold-out set prediction quality (y-axis). It shows that the more that the segments disagreed, the worse became the prediction performance.

Demographic Prediction Models

We now turn to using these predictors to predict $Pr(d_j|x)$ using different prediction models to further illustrate various aspects of the invention. In order to analyze different methods for predicting demographics, we implemented six prediction models algorithms:

1. Random audit: Pick a Random, previously-audited property and use its audit distribution.

2. High disparity audits: Pick the highest disparity property.

3. Average the historical audits: Average of distributions from all previously-audited properties found on the request $$SAVG = \frac{1}{\#X_A}\sum_{X_A} Pr(d_j | x \in X_A):Pr(z \in X_A) \geq \varepsilon$$

The average of audit results for segments on the web request, and only segments are averaged which appeared more than a threshold ε.

4. Site historical/Site Whitelist: Use the site's historical audit to predict the probability distribution $$U=Pr(d_j|x \in X_U)$$

Where U was the historical audit for the URL or site.

5. Logistic regression: Train a logistic regression model to predict demographic probability given the properties expressed on the pseudo-request.

6. Disagreement weighted combination of site and segment:

$$BAVG(d_j|x)=W \cdot S+(1-W) \cdot U$$

Where U is the historical audit for the URL or site. This provides a robust prediction if there is no segment information or if the segment probabilities are contradictory (see below):

$$U=Pr(d_j|x \in X_U)$$

SAVG are the average of audit results for segments on the web request, and only segments are averaged which appeared more than a threshold ∈.

$$SAVG = \frac{1}{\#X_A}\sum_{X_A} Pr(d_j | x \in X_A):Pr(z \in X_A) \geq \varepsilon$$

Weights W minimizes the squared error between the predictor BAVG and actual demographic audit results. The weights determine how much emphasis to put on user-specific information (segments) versus the site URL. If the segments have high disagreement D, then more weight would be placed on the site.

$$W_T:\min\sum_{X_A}(BAVG(d_j|x \in X_A) - Pr(d_j|x))^2:D(x) \in (L_T \ldots U_T)$$

Each weight $W_T$ is defined for a different level of "disagreement" between the segments, where disagreement is defined as the standard deviation of segment audit probabilities.

$$D(x) = \sqrt{\frac{1}{N}\sum_{X_A}(Pr(d_j|x \in X_A) - SAVG)^2}$$

We also define one other prediction model for analysis: segment at random "SEGR" and returns its demographic age-gender audit as the prediction. This prediction model is a good diagnostic for seeing the effectiveness of "picking a segment at random". Algorithms SAVG, BAVG, Site, Random have a practical advantage in that they don't necessarily need to be trained using a training process. Training approaches aren't universally positive in this application. One of the issues is the set of segments available in the data may change fairly frequently. As a result, a process that attempts to develop regression weights for particular segments, may quickly find that the segments being encountered in practice are different. Therefore a model which is not "particular" about the segments being used, but instead calcujlates an "on-the-fly" estimate of agreement, may actually be far more robust, than calculating exact coefficients for each segment. However for linear, logistic regression, or other similar approaches, a training process is required, and we describe a method for very fast parameter estimation next.

Fast and Low Space Complexity Demographic Prediction Model Training/Parameter Fitting In order to train the prediction models, a customized framework can be employed that allows us to first come to terms with the size of data and then provide for a way to reduce it.

A. Efficient Model Training by "Striping" Data to Create Audit Level Probabilistic Features and Predictions Williams et. al. (2014) reported on a commercial approach to this problem in which user features were created, and then batch labels are then assigned to requests to create training data. For example, given a batch of 10,000 users from a site called "website.com", with age18to20 probability=0.4, Williams et al. suggest that this Oracle audit be converted into a training set with redundant copies of the same 10,000 users, each labeled with age18to20 probability equal to 0.4. Although proposing this approach, Williams (2014) explain that they actually didn't assign the 10,000 cases to equal the class probability 0.4, but instead used randomly assigned, fixed, discrete {0,1} labels. For 10,000 users, this would result in 4,000 with randomly assigned Pr(age18to20)=1 and 6,000 would be randomly assigned Pr(age18to24)=0. This data is then added to other Oracle audits that are similarly converted into duplicated rows with binary assigned labels. This data set is then used for induction of a logistic regression model which is ultimately used to create a new segment with high in-target rate.

The approach suggested in Williams of labeling all of the users in the audit batch with the batch label introduces artificial error into the training set. Specifically, the error per case will be equal to $$2 \cdot Pr(d_j|x) \cdot (1-Pr(d_j|x)).$$

A second practical challenge of the approach suggested by Williams is that the potential data set generated from this kind of approach will be gigantic. A typical ad server might have to process about 2 billion requests per day. Typical training complexity is O(N·M) where M are the number of properties and N the number of observations; in this case 2 billion. That means that 8 months of audit data would produce 480 billion requests. That data set then needs to be given to a machine learning algorithm for training purposes. Thus, the approach suggested by Williams is impractical and inefficient. In contrast to this approach, the present invention enables the data to be maintained at the audit "grain" which carries a significant computational complexity advantage.

To give an example, consider what happens after the data-set above—which has been generated by creating redundant copies with the same class label—is sent to a conventional machine learning or statistical training algorithm. A conventional training algorithm needs to calculate derivatives on its energy function to minimize its model error. Using linear regression as an example, defining the problem in "request space", where X is a matrix with historical requests on rows and properties as columns, and where each element is 0 or 1, and Y are demographics inferred from the batch, and W is a vector with rows equal to the number of properties.

$$Y=X \cdot W$$

The derivatives for the squared error of case i with respect to each weight j equals:

$$\frac{dE}{dw_{ji}} = (w_{ji}x_i - y_i)x_i$$

where $x_i=0$ if the property i is not present, or 1 if it is present, and $y_{iA}$ is the probability provided by the Oracle for batch $X_A$ cases.

Since the historical web requests are actually "striped" in those redundant batches, we now observe that $y_i$ is the same for every row in the batch, and also $x_i$ as 1 or 0 can be summed to create a probability which is measured for the batch. We can therefore introduce $Pr(x_i|X_A)$ which is the probability of property i being present given that we are looking at results for batch $X_A$. The batch derivatives now become:

$$\frac{dE}{dw_{ji}} = (w_{ji}Pr(x_i|X_A) - y_i) \cdot N \cdot Pr(x_i|X_A)$$

where N are the number of impressions in the batch.

We can show that the derivatives for the above formula are the same as the derivatives for:

$$Y = P \cdot W$$

where $P=Pr(x_i|X_A)$ is a matrix with properties across and audits down, Y is a vector of length equal to audits with demographics, and W is a vector of length number of audits and assuming equal audit batch sizes (if they are not equal then the error function becomes squared error weighted by the number of impressions in each audit).

We can now calculate derivatives in batches, assuming the existence of a new probability matrix P. This creates a significant computational complexity saving during training. Calculating P is an O(N) operation (assuming the property-audit probabilities are hashed in memory) and can be pre-computed in advance in distributed fashion. After this, the training algorithm only needs to operate on a matrix with size equal to the number of audits times properties A·M, so a typical training complexity would then be O(A·M+N). The number of actual audits executed by ad servers tends to be small—a typical number might be A=10,000. Therefore training time will drop by a factor of around $2\times10^5$ inclusive of the initial pass to calculate the probability matrix. The computational complexity reduction is significant—not only is training time lower, but many training algorithms need data to be loaded into main memory, and since the matrix size is reduced by the same factor, it is possible to run more complex algorithms in main memory.

In summary, by the time web-request-level data with batch labels reaches the training algorithm, most training algorithms will create an aggregated weight anyway. Thus there is no gain from working with the data at the web-request level. Because of the fact that the same label is being applied to batches of requests, the weight updates based on these cases are the same when processing an aggregate or each case individually. We can save a lot of unnecessary computational work by re-factoring the problem into an expression with probabilities that operate in the diminutive "audit space", instead of the massive "request space". Since ad-servers have to service huge amounts of traffic, the speed-up from operating on probabilistic features in audit space is extremely significant.

Accuracy Measurement Techniques on Aggregated Data

We now turn to accuracy measurement. Because Oracle data is only available in aggregate, there is no ground truth information about the demographics of particular web requests. As a result, special techniques need to be devised in order to create meaningful measures of accuracy. We describe several accuracy measurement components below:

1. Algorithm Audits

Figure 13:
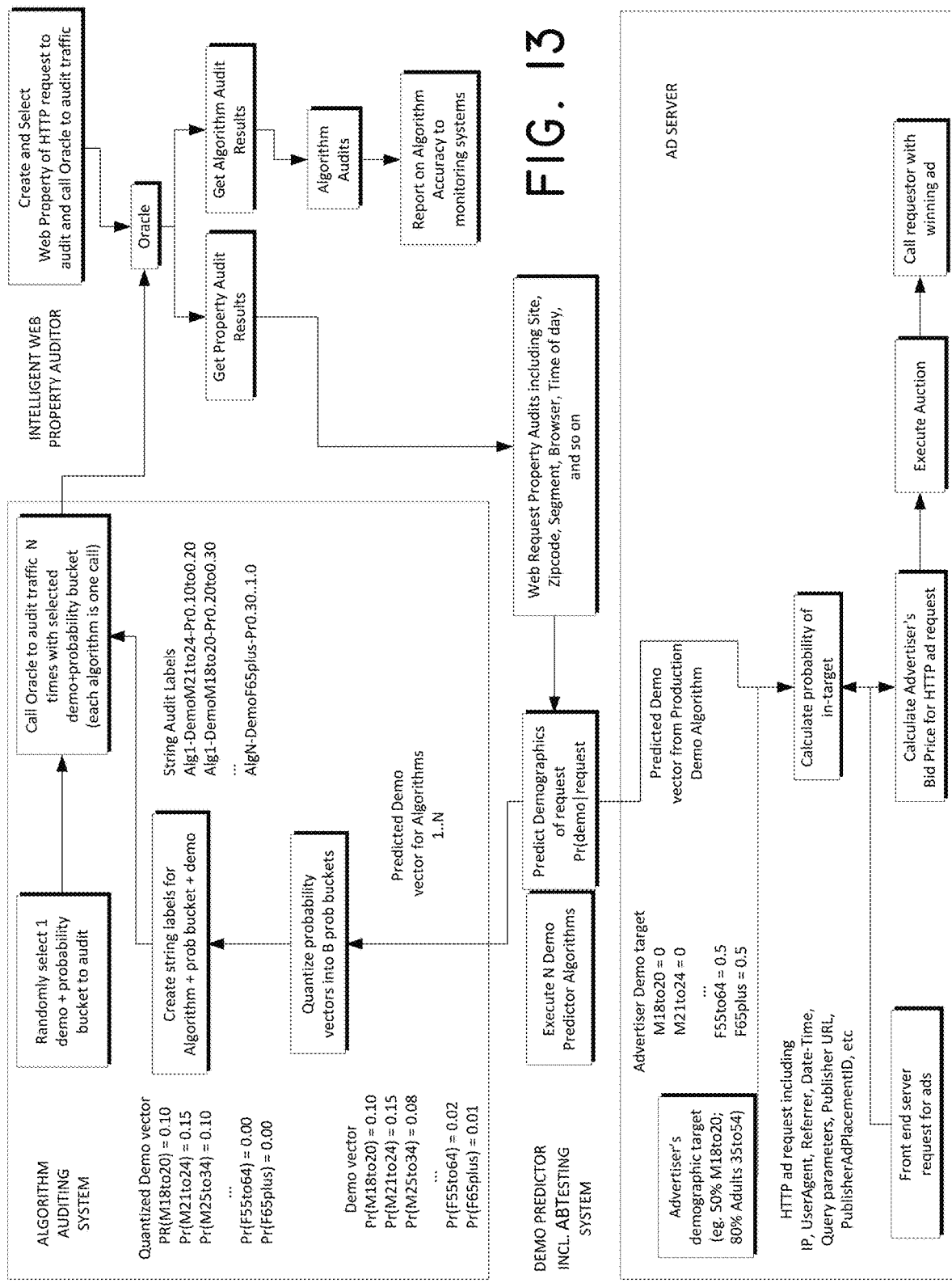
FIG. 13 is an illustration of possible interactions between an algorithm auditing system, a demo predictor system, and a web property auditor for some embodiments of the disclosure.
Figure 14:
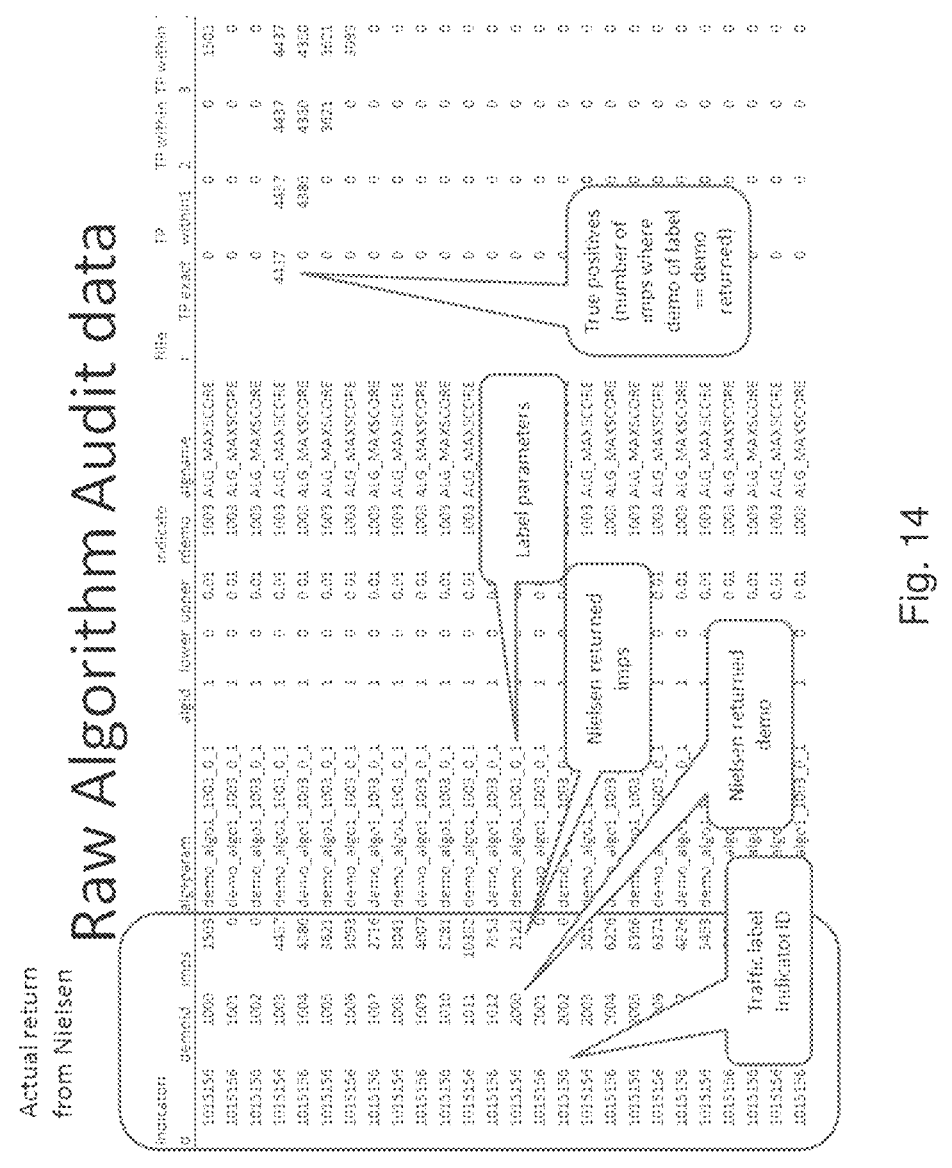
Figure 15:
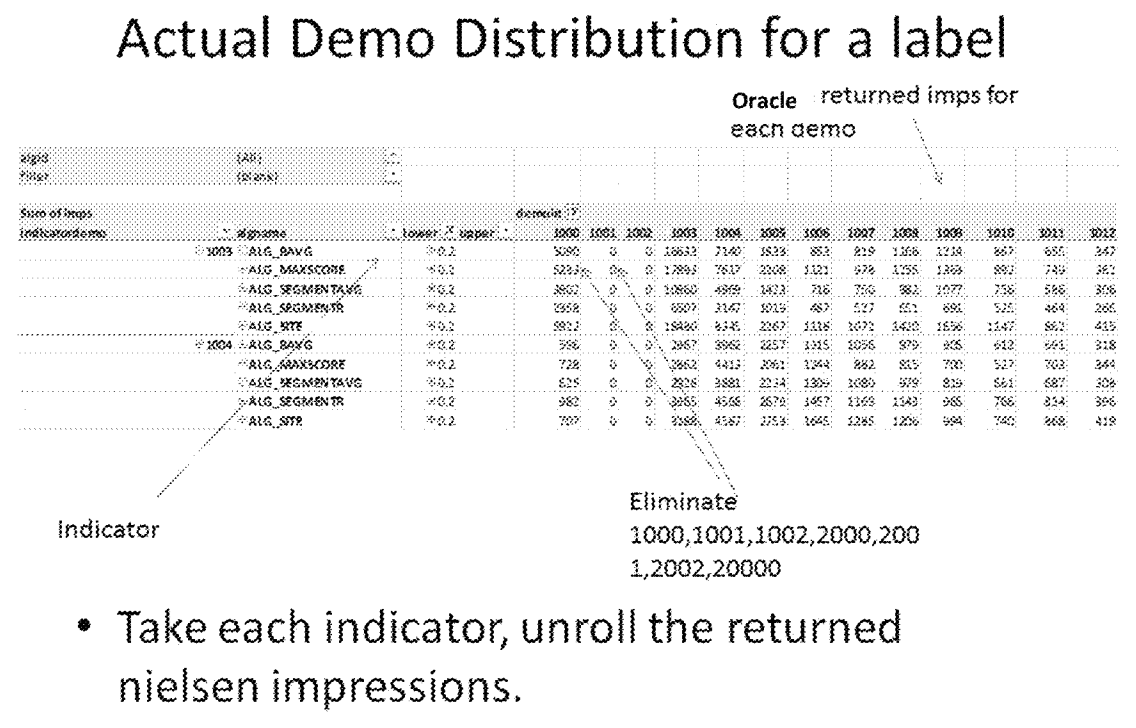
Figure 16:
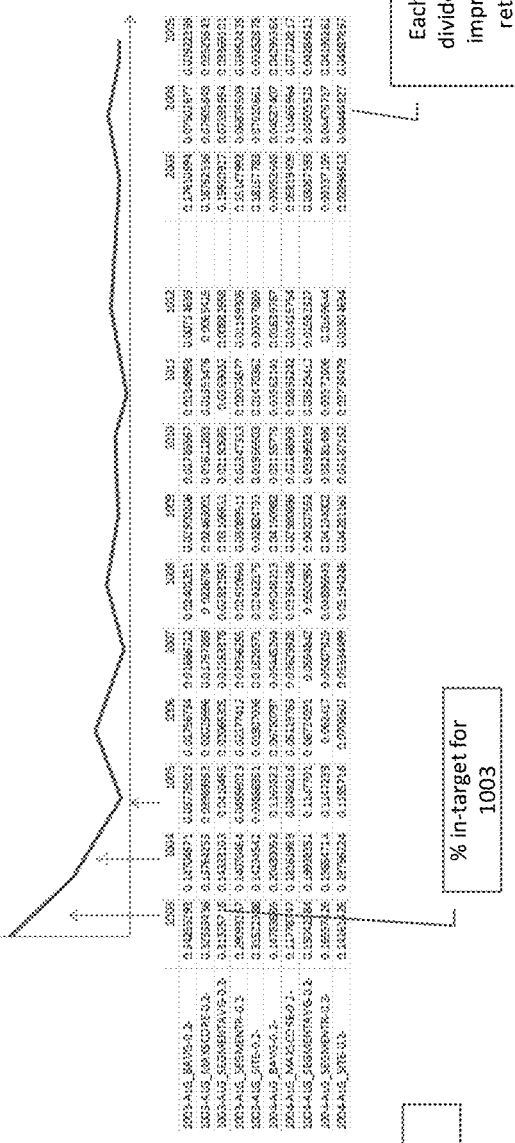
Figure 17A:
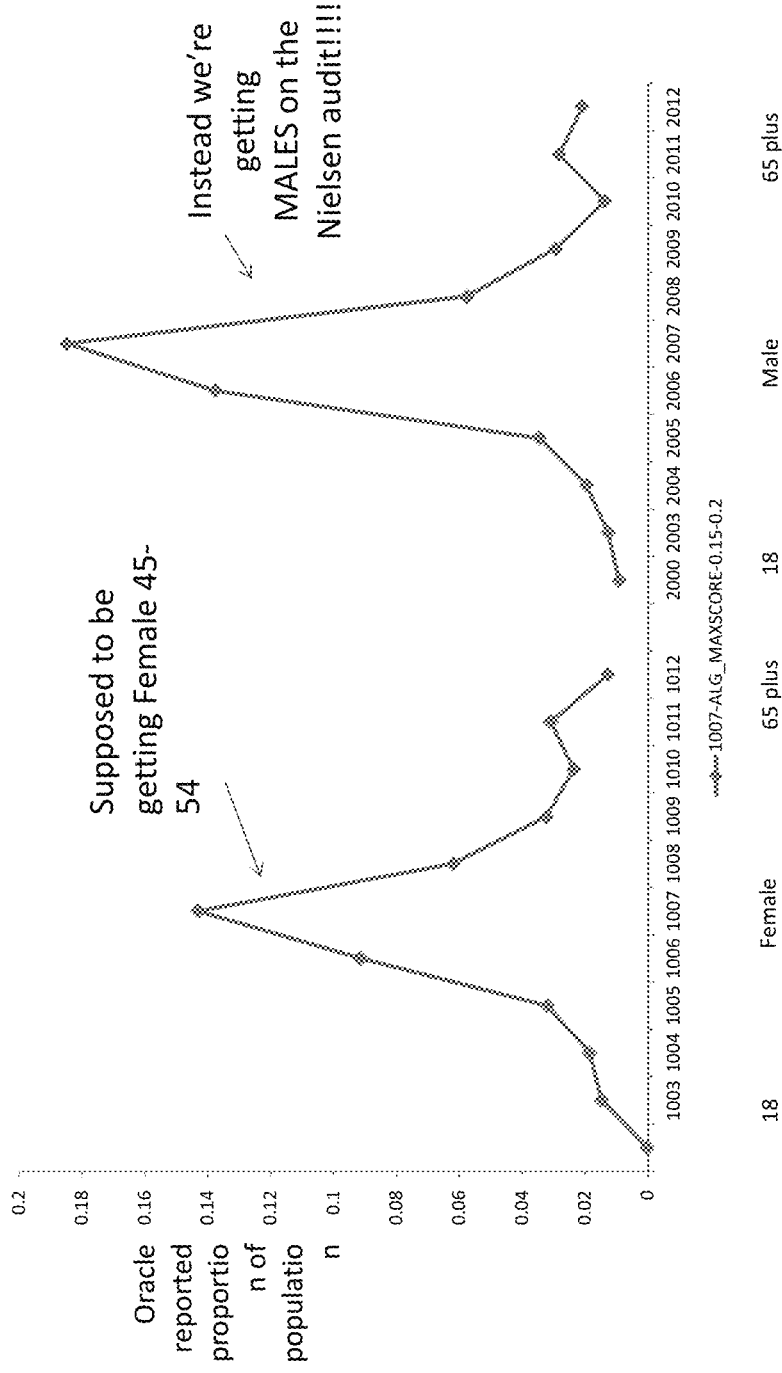
FIGS. 17A and 17B are illustrations of a comparing performance of different demographic predictor models in accordance with some implementations of the disclosure.
Figure 17B:
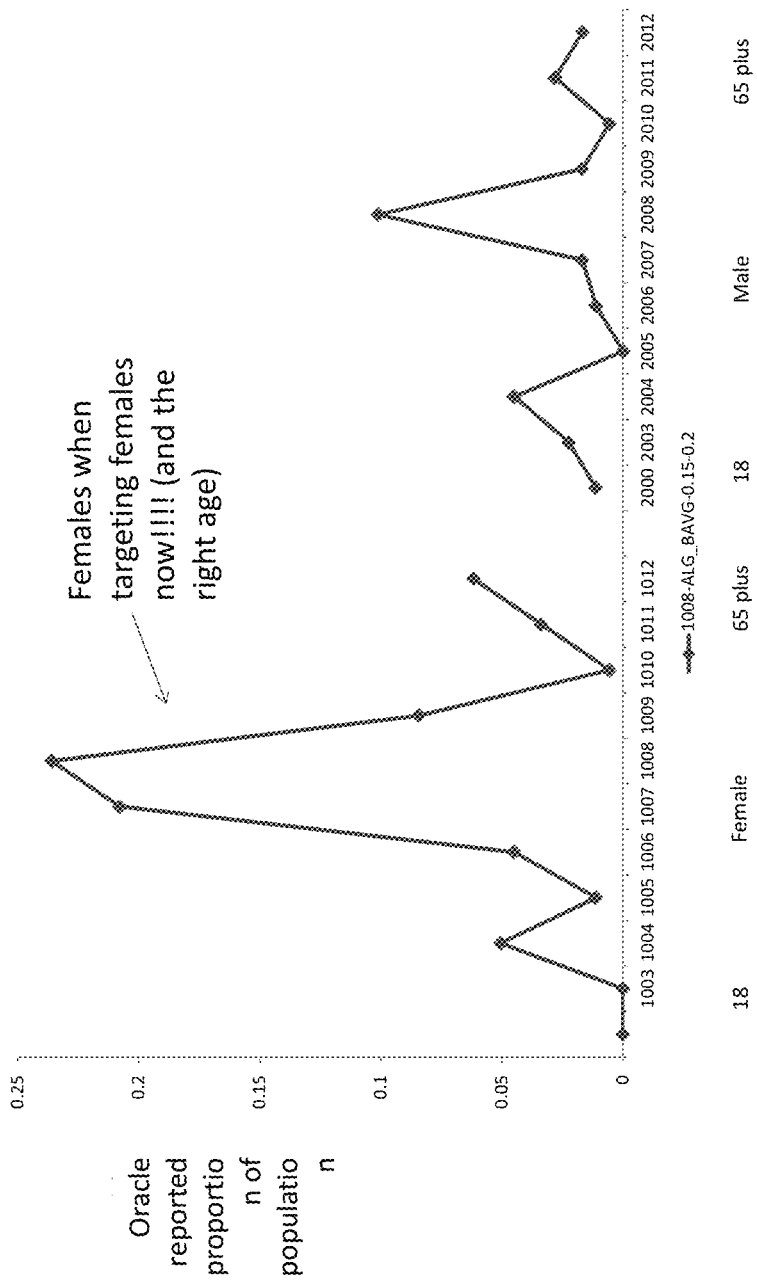
Figure 20:
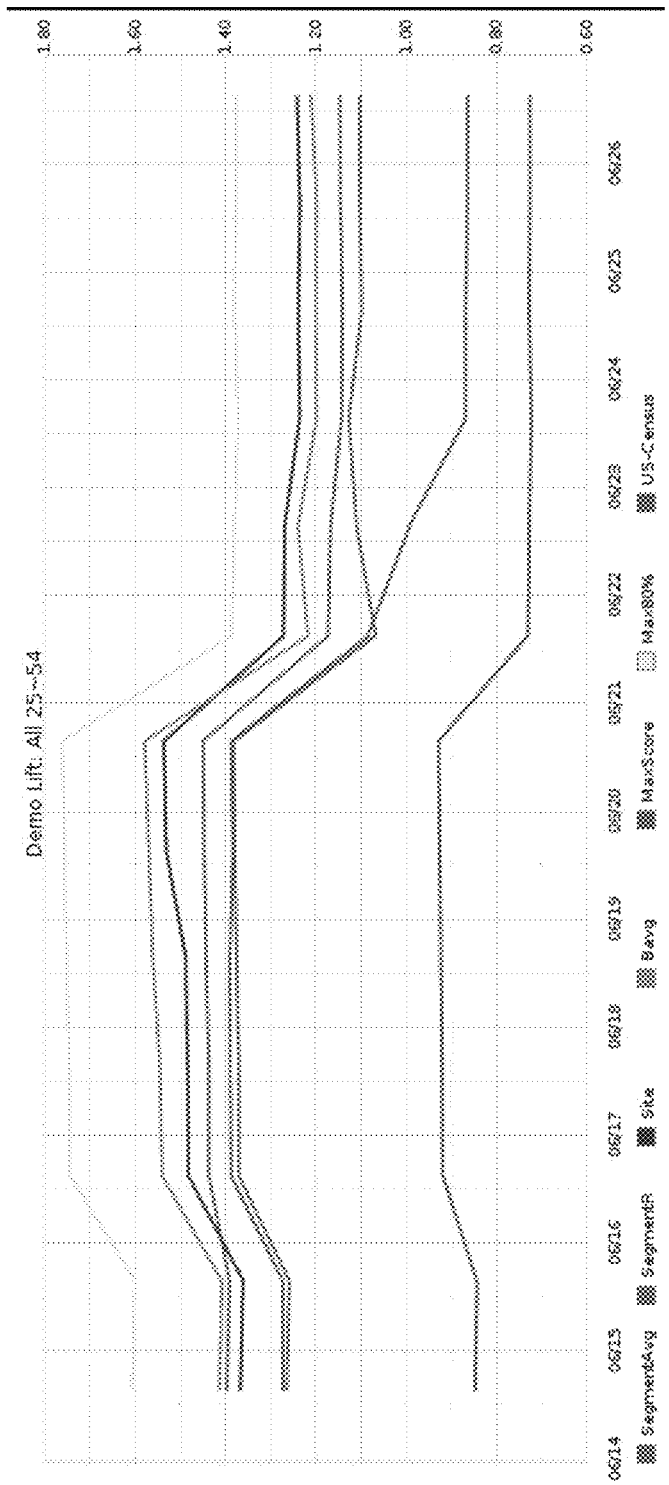
Figure 21:
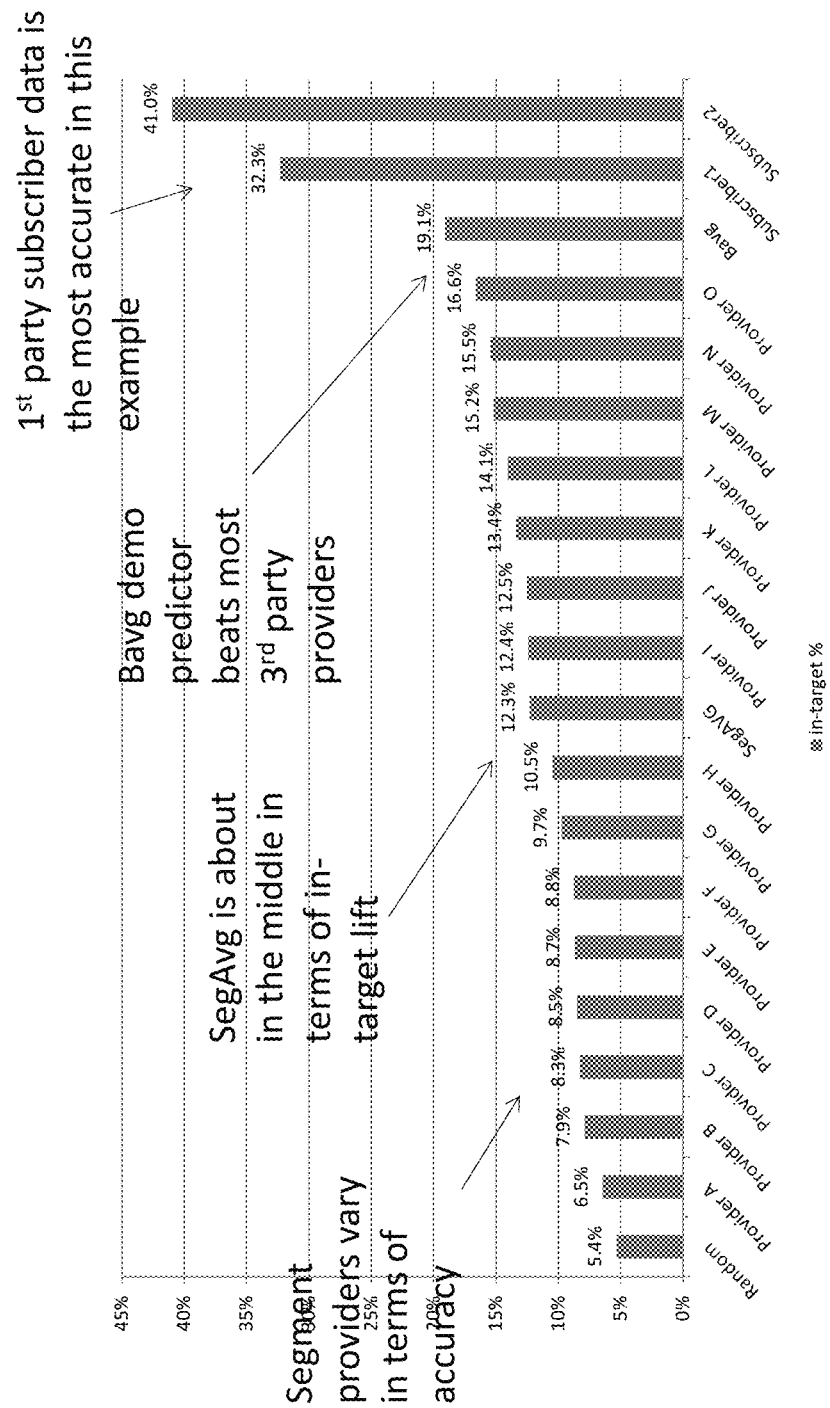
FIG. 21 is an illustration of a visualization comparing in-target percentage for multiple third party demographic providers.

Measuring accuracy is non-trivial since there is no independent source of truth other than the Oracle. Quite simply, it is not possible to find the known demographics of the web request. The invention solves this problem by creating method for measuring algorithm accuracy called "algorithm audits". Automated measurements of the quality of the system can be obtained using a measurement process that called "Automated ABTests using algorithm auditing". Several aspects of Algorithm Audits are illustrated in FIGS. 13-15.

For example, let's say that a web request has been processed by a prediction algorithm, and a demographic prediction created. This prediction could now itself be regarded as another 0-1 property of the web request. We can now create a batch label consisting of the combination of algorithm+demographic+score threshold for this particular web request (eg. Alg1+M18to24+0.15 . . . 0.20).

In our experiments we used 5 algorithms, 6 score buckets and 24 demographics. For each algorithm audit the Oracle responded with another 24 demographics showing "actual" impressions across the demographics. This led to 17,280 combinations of algorithm+predicted demographic+score bucket+actual demographic and the resulting actual probability. As example of the generation of raw data is provided below, followed by an example of how to create a distribution analysis.

2. Demographic Population Distributions

Figure 10A:
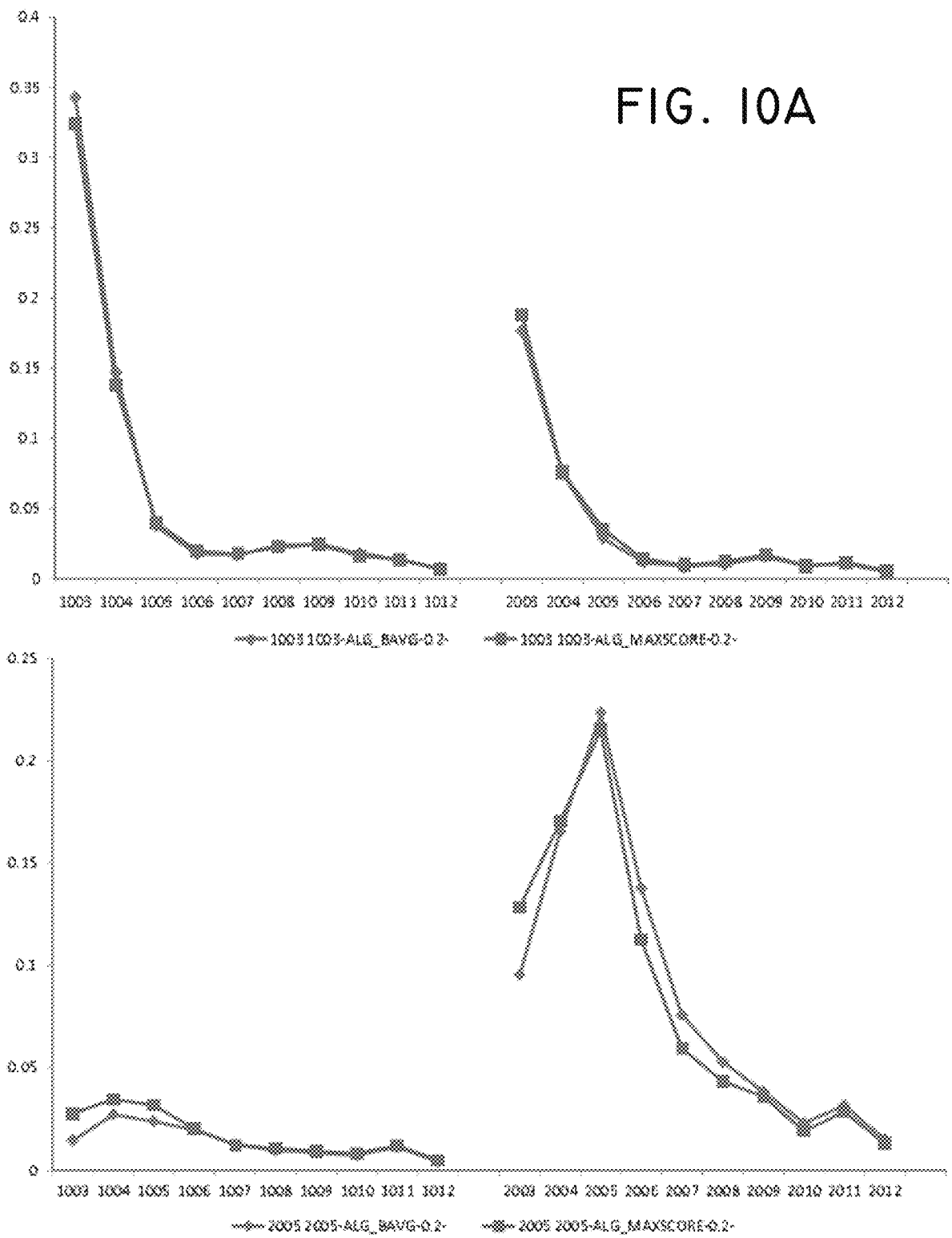

For each predicted demographic and probability (eg. Alg1+Male18to24+predicted probability=15% . . . 20%), we could now show the distribution of actual returned demographics (eg. Male 18to24=12%, Male25to34=10%, . . . , Female65+=4%). For an accurate demographic prediction algorith—and a high prediction score for Male18to24 such as 20% —we would ideally see 100% of actuals in the true demographic, and then 0% in erroneous demographics. These graphs are shown in FIGS. 9, 10A and 10B. This provides an easy to understand graphical picture of the quality of the prediction, and the match to ideal can be calculated using several methods, one method of which will be described next).

3. In-Target Percentage

One method for summarizing the distribution match is to calculate the in-target percentage. This is the percentage of the returned Oracle distribution that falls into the correct demographic. This also happens to be the key metric that advertisers use when planning their campaigns. In-Target Percentage is equal to the percentage of impressions bought which match the demographic that they are targeting—this rate should be proportional to advertiser ROI.

Several accuracy measurements can also be performed on this data. The following are some examples:

(i) Demographic Population Distributions Comparison to Ideal:

For each predicted demographic and probability (eg. Alg1+Male18to24+predicted probability=15% . . . 20%), we could now show the distribution of actual returned demographics (eg. Male 18to24=12%, Male25to34=10%, . . . , Female65plus=4%). For an accurate demographic prediction algorithm—and a high prediction score for Male18to24 such as 20%—we would ideally see 100% of actuals in the true demographic, and then 0% in erroneous demographics. These graphs are shown in FIGS. 3 and 4. This provides an easy to understand graphical picture of the quality of the prediction, and the match to ideal can be calculated using several methods (we will describe one method next).

(ii) In-Target Percentage and in-Target Lift Over Random

One method for summarizing the distribution match is to calculate the in-target percentage. This is the percentage of the returned Oracle distribution that falls into the correct demographic. This also happens to be the key metric that advertisers use when planning their campaigns. In-Target Percentage is equal to the percentage of impressions bought which match the demographic that they are targeting—this rate should be proportional to advertiser ROI.

Advertisers often consider In-Target Percentages of 46% or better to be "high" and "desirable". However, for accurately measuring algorithm performance, it is necessary to use a more precise metric. The key problem with simply reporting in-target rate, is In-Target Percentages vary based on the particular age-gender range that is being targeted (see e.g., Nielsen, 2014). For example, Adults 25 to 54 has a random In-Target rate of 56%—so actually a report of in-target at 50% is actually worse than random. Therefore, in order to make the demographics comparable, we can add the expected In-Target Rate at random and then report on In-Target Lift as the In-Target Rate divided by the random In-Target Rate. This provides an apples-to-apples measure of quality.

Table 10, below, shows that BAVG produces 5.1× In-Target Lift if an advertiser were to use predictions in the 20% or above prediction bucket.

TABLE 10

In-Target lift for 6 probability thresholds

| lower | Upper | BAVG | SITE | SAVG | SEGR |
|---|---|---|---|---|---|
| 0.20 | 1.00 | 5.19 | 4.62 | 4.17 | 3.91 |
| 0.15 | 0.20 | 3.53 | 3.15 | 3.09 | 2.82 |
| 0.10 | 0.15 | 2.14 | 2.23 | 2.84 | 2.18 |
| 0.05 | 0.10 | 1.18 | 1.23 | 0.94 | 1.27 |
| 0.01 | 0.05 | 0.64 | 0.98 | 0.88 | 1.11 |
| 0.00 | 0.01 | 0.06 | 0.12 | 0.47 | 0.42 |

4. In-Target Estimate of Bid Error

Although In-Target Percentage is used widely in business, it is not ideal for ad buying calculations—such as those which might be performed by an adserver bid optimization system. We need a measure that captures the quality of prediction across all traffic and predictions.

One common example in machine learning to measure prediction quality in other contexts involves using Area Under the Response Operator Curve (AUC). However, this can lead to misleading results in this particular domain. AUC is invariant to scale, shift and rank-preserving non-linearities. If the in-target prediction is consistently offset too high, or consistently scaled too low, then the resulting bid prices will be too high, revenue losses will accrue.

Embodiments of the invention, therefore, use other measures that capture the effectiveness of the in-target prediction for ad buying purposes, where the particular scale and bias in the numerical score matters. For example, during bidding, the absolute difference between bid price placed $b_i$ given the prediction provided, and optimal bid price $b_i^*$, had we had a predictor that exactly equaled actual is equal to:

$$err_t = \sum_i^N |b_i^* - b_i| \qquad (6)$$

A bid that maximizes spend subject to a $CPA_t$ constraint is to set bid price equal to the in-target rate multiplied with $CPA_t$ $$b_i = y_i \cdot CPA_t$$

where $y_i$ is the in-target rate of impression i., Assuming $y_i^*$ is the actual in-target rate (that the predictor should have predicted), we can now re-write our bid error formula (6) as follows:

$$err_t = \sum_i^I |y_i^* \cdot CPA_t - y_i \cdot CPA_t| \qquad (7)$$

$$= CPA_t \sum_i^N |y_i^* - y_i|$$

Therefore, the sum of difference of in-target predicted versus actual better captures the economics of how in-target rates are used in ad buying than some of more commonly used metrics such as AUC. Table 11, below, shows squared differences by demographic for BAVG versus SAVG. Note that error is lower for BAVG in 17 out of 20 cases.

TABLE 11

Mean absolute error across entire range of prediction scores, weighted by traffic, by demographic for two algorithms

| Demo | BAVG squared error | SAVG squared error |
|---|---|---|
| F 18-20 | 0.033% | 0.038% |
| F 21-24 | 0.084% | 0.135% |
| F 25-29 | 0.017% | 0.029% |
| F 30-34 | 0.044% | 0.030% |
| F 35-39 | 0.039% | 0.001% |
| F 40-44 | 0.016% | 0.019% |
| F 45-49 | 0.028% | 0.055% |
| F 50-54 | 0.010% | 0.020% |
| F 55-64 | 0.094% | 0.105% |
| F 65+ | 0.133% | 0.091% |
| M 2-11 | 0.010% | 0.108% |
| M 12-17 | 0.074% | 0.144% |
| M 18-20 | 0.062% | 0.119% |
| M 21-24 | 0.013% | 0.015% |
| M 25-29 | 0.038% | 0.058% |
| M 30-34 | 0.038% | 0.050% |
| M 35-39 | 0.037% | 0.065% |
| M 40-44 | 0.079% | 0.082% |
| M 45-49 | 0.057% | 0.085% |
| M 50-54 | 0.036% | 0.042% |

Turning now to FIG. 11, we can also show overall prediction quality graphically by showing a scatterplot of forecast versus actual using the prediction buckets as the forecasts. A perfect predictor would have predictions exactly on the diagonal of this chart.

The following Table 12 shows an example of expected in-target rates at random 20 mutually exclusive demographics. The expected rate for any combination can therefore be summed. For instance, the expected in-target rate for F25 to 49, assuming random serving of content or ads, is 19.4%.

TABLE 12

| Demographic | Expected In-Target (random) |
|---|---|
| FEMALE 18-20 | 2.54% |
| FEMALE 21-24 | 2.99% |
| FEMALE 25-29 | 3.72% |
| FEMALE 30-34 | 3.77% |
| FEMALE 35-39 | 3.57% |
| FEMALE 40-44 | 4.09% |
| FEMALE 45-49 | 4.26% |
| FEMALE 50-54 | 5.31% |
| FEMALE 55-64 | 9.48% |
| FEMALE 65+ | 7.58% |
| MALE 18-20 | 2.78% |
| MALE 21-24 | 3.68% |
| MALE 25-29 | 6.23% |
| MALE 30-34 | 5.29% |
| MALE 35-39 | 4.67% |
| MALE 40-44 | 5.03% |
| MALE 45-49 | 5.37% |
| MALE 50-54 | 4.66% |
| MALE 55-64 | 8.71% |
| MALE 65+ | 6.26% |

The following Table 13 is an illustration of predicted demographic probability versus actual demographic probability. For example, for traffic that was in bucket 0.20 . . . 1.00, the BAVG algorithm predicted the traffic's probability of having the demographic equal to 28.3%. Actual was 30.5%. SAVG predicted 22.7%, which was much lower than actual at 31.7%.

TABLE 13

Predicted vs. Actual Demographic Probability

| Low | Hi | BAVG mean pred | BAVG Oracle actual | BAVG traffic | SAVG mean pred | SAVG Oracle Actual | SAVG Traffic |
|---|---|---|---|---|---|---|---|
| 0.20 | 1.00 | 28.3% | 30.5% | 4.3% | 22.7% | 31.7% | 6.8% |
| 0.15 | 0.20 | 19.3% | 17.0% | 1.3% | 16.8% | 17.1% | 1.0% |
| 0.10 | 0.15 | 11.7% | 11.8% | 7.3% | 15.5% | 11.8% | 9.8% |
| 0.05 | 0.10 | 6.4% | 7.6% | 53.9% | 5.1% | 7.8% | 35.8% |
| 0.01 | 0.05 | 3.5% | 3.5% | 16.2% | 4.8% | 3.0% | 21.9% |
| 0.00 | 0.01 | 0.4% | 0.7% | 17.0% | 2.5% | 0.7% | 24.6% |

The following Table 14 is an example of Mean absolute error across entire range of prediction scores, weighted by traffic, by demographic for two algorithms. Error is lower for BAVG in 17 out of 20 cases.

TABLE 14

Mean absolute error across entire range

| Demo | BAVG squared error | SAVG squared error |
|---|---|---|
| F 18-20 | 0.033% | 0.038% |
| F 21-24 | 0.084% | 0.135% |
| F 25-29 | 0.017% | 0.029% |
| F 30-34 | 0.044% | 0.030% |
| F 35-39 | 0.039% | 0.001% |
| F 40-44 | 0.016% | 0.019% |
| F 45-49 | 0.028% | 0.055% |
| F 50-54 | 0.010% | 0.020% |
| F 55-64 | 0.094% | 0.105% |
| F 65+ | 0.133% | 0.091% |
| M 2-11 | 0.010% | 0.108% |
| M 12-17 | 0.074% | 0.144% |
| M 18-20 | 0.062% | 0.119% |
| M 21-24 | 0.013% | 0.015% |
| M 25-29 | 0.038% | 0.058% |
| M 30-34 | 0.038% | 0.050% |

TABLE 14-continued

Mean absolute error across entire range

| Demo | BAVG squared error | SAVG squared error |
|---|---|---|
| M 35-39 | 0.037% | 0.065% |
| M 40-44 | 0.079% | 0.082% |
| M 45-49 | 0.057% | 0.085% |
| M 50-54 | 0.036% | 0.042% |

4. Measuring Accuracy on Wider Ranges

We have discussed some measurement techniques including calculating in-target rate, in-target lift, bid error, and so on. Each of these algorithms is a measurement for a specific demographic or set of demographics.

Oracles often report demographics for age-gender as a set of 20 or 24 mutually exclusive age-gender ranges (as shown in tables earlier). The algorithms reported here can measure accuracy for each demographic range such as Male25to34. However, advertisers often want to know the in-target rate for wider ranges, such as Adults25to54. How can we combine the results available for each individual discrete demographic, to create an estimate for a wider range?

Two techniques are available:
(a) Explicitly audit the wider range:
  a. This involves creating an indicator for the wider range such as Adults25to54 and then explicitly auditing it.
(b) Summing narrow breaks to create the wide break: There are two approaches here
  a. simply sum the impressions from each break that are desired, and divide by the total impressions, for example, Adults25to34, Adults35to44, Adults45to54 are each summed for impressions in these buckets, and then divided by total impressions that were observed in Adults25to34, Adults35to44 and Adults 45to54.
  b. For each break, "re-normalize" to a standard number of impressions (e.g., 1 million), and the expectation for this break (e.g., we expect Adults18to24 to be 5.4% of traffic; therefore scale Adults18to24 to 54,000), and then sum the in-target, and sum the total scaled impressions. This approach attempts to model the probability of encountering different demographics, and avoid errors from creeping in due to the particular set of audits that were received (the Oracle often doesn't send a response back in all cases).

5. A/B Testing Framework

Automated measurements of the quality of the system can be obtained using an Algorithm A/B Testing Framework. The A/B Algorithm Testing Framework can be deployed natively within the production system to measure the accuracy of different algorithms. The purpose of this testing is to measure one Algorithm against another and measure accuracy using several methods including "bidding error" (defined elsewhere). Under the present architecture, the Demographic Providers are made available using in-memory hash data structures. With this information readily available, there is very little cost in evaluating not one, but N different demographic predictor models in parallel. Each demographic predictor is just a few numerical evaluations. Therefore, multiple models can be continually executed and A/B tested against each other. With N demographic predictor models, each being executed in real-time, by the main demographic predictor module, each one can be subject to auditing.

A. Example Use of the AB Testing Framework

Let's say that a web request has been processed by one of the prediction models above (eg. Alg1), and a demographic prediction has been created. The "key insight" is that this prediction can now itself be regarded as another 0-1 property of the web request. We can now create a batch label consisting of the combination of algorithm+demographic+score threshold for this particular web request (eg. Alg1+Male18to24+0.15 . . . 0.20).

For example, for a particular request, the demo predictor creates a demo probability prediction. Let's say the prediction is Pr(Male18to24)=0.18, and the algorithm generating it was Alg1, The current invention then discretizes/quantizes the prediction score to a particular discrete bucket. Let's say that we have set up the following ranges (0, 0 . . . 0.01, 0.01 . . . 0.02, 0.02 . . . 0.05, 0.05 . . . 0.10, 0.15 . . . 0.20, 0.20 . . . 1.0). The prediction 0.18 will therefore be discretized to the range 0.15 . . . 0.20. The process now sets this threshold, along with algorithm name, and other information, to be the "label" for this special kind of traffic that will itself be audited. For example, the label sent to the Oracle may be "Alg1+Male18to24+0.15 . . . 0.20". At some time later, the Oracle will have collected enough samples of these labels (and others), and it can be interrogated to obtain the Oracle's actual distribution of each demographic. For the label "Alg1+Male18to24+0.15 . . . 0.20", we therefore will have reported back 24 demographics along with the actual probability, eg. (Male18to24=0.2, Male25to34=0.1, etc). The demographic algorithm prediction, can then be compared against the "ground truth" from the Oracle. It is then possible to measure multiple algorithms and their quality in producing demographic probabilities that match the Oracle.

Figure 12:
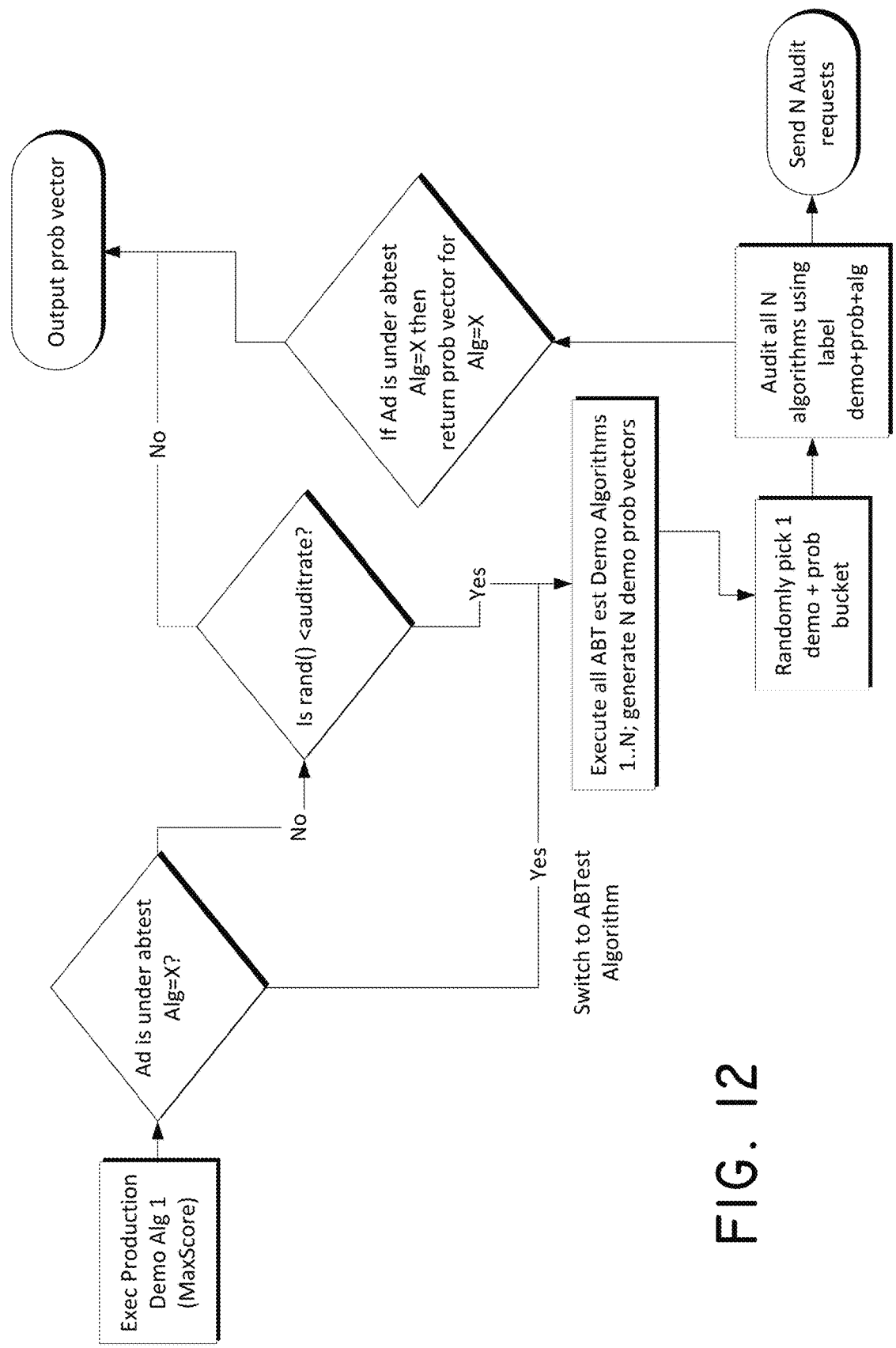
FIG. 12 is an illustration of ABTest logic.

Flow charts showing Algorithm Audit logic are shown in FIGS. 12 and 13. In addition, the Table 12 shows an example of an "Algorithm Audit" batch label. We define indicators for specific algorithm+demo+problower_probupper buckets.

TABLE 15

| indicatorid | demoid | imps | alg + param | algid | lower | upper | indicatordemo | algname filler |
|---|---|---|---|---|---|---|---|---|
| 1015144 | 1000 | 706 | demo_algo1_1001_0_1 | 1 | 0 | 0.01 | 1001 | ALG_MAXSCORE |
| 1015144 | 1001 | 0 | demo_algo1_1001_0_1 | 1 | 0 | 0.01 | 1001 | ALG_MAXSCORE |
| 1015144 | 1002 | 0 | demo_algo1_1001_0_1 | 1 | 0 | 0.01 | 1001 | ALG_MAXSCORE |
| 1015144 | 1003 | 1418 | demo_algo1_1001_0_1 | 1 | 0 | 0.01 | 1001 | ALG_MAXSCORE |

Each indicator is then sent in real-time to the Oracle, so as to audit this traffic. The results return as follows:
[{"campaignDataDate": "10/21/2015","campaignId": 416300195,"siteId":6974903,"countryCode":"US","demoId":1999, "placementId": 607742153, "tagPlacementId": "1017633", "reach":"185", "impressions":"248", "universeEstimate":"135950000", "measuredRate": " ","viewableRate":" ","viewableImpressions":" ", "viewableImpressionsPercentage":" ", "nonViewableImpressions":" ", "nonViewableImpressionsPercentage":" ", "undeterminedImpressions":" ", "undeterminedImpressionsPercentage":" "}, The data is translated into columns as illustrated in Table 16, below:

TABLE 16

| Indicatorid | demoid | imps | alg + param | algid | lower | upper | indicatordemo | algname | filler |
|---|---|---|---|---|---|---|---|---|---|
| 1015144 | 1000 | 706 | demo_algo1_1001_0_1 | 1 | 0 | 0.01 | 1001 | ALG_MAXSCORE | |
| 1015144 | 1001 | 0 | demo_algo1_1001_0_1 | 1 | 0 | 0.01 | 1001 | ALG_MAXSCORE | |
| 1015144 | 1002 | 0 | demo_algo1_1001_0_1 | 1 | 0 | 0.01 | 1001 | ALG_MAXSCORE | |
| 1015144 | 1003 | 1418 | demo_algo1_1001_0_1 | 1 | 0 | 0.01 | 1001 | ALG_MAXSCORE | |
| 1015144 | 1004 | 1675 | demo_algo1_1001_0_1 | 1 | 0 | 0.01 | 1001 | ALG_MAXSCORE | |
| 1015144 | 1005 | 2211 | demo_algo1_1001_0_1 | 1 | 0 | 0.01 | 1001 | ALG_MAXSCORE | |
| 1015144 | 1006 | 2420 | demo_algo1_1001_0_1 | 1 | 0 | 0.01 | 1001 | ALG_MAXSCORE | |
| 1015144 | 1007 | 2502 | demo_algo1_1001_0_1 | 1 | 0 | 0.01 | 1001 | ALG_MAXSCORE | |
| 1015144 | 1008 | 3077 | demo_algo1_1001_0_1 | 1 | 0 | 0.01 | 1001 | ALG_MAXSCORE | |
| 1015144 | 1009 | 3728 | demo_algo1_1001_0_1 | 1 | 0 | 0.01 | 1001 | ALG_MAXSCORE | |
| 1015144 | 1010 | 5140 | demo_algo1_1001_0_1 | 1 | 0 | 0.01 | 1001 | ALG_MAXSCORE | |
| 1015144 | 1011 | 9919 | demo_algo1_1001_0_1 | 1 | 0 | 0.01 | 1001 | ALG_MAXSCORE | |
| 1015144 | 1012 | 8322 | demo_algo1_1001_0_1 | 1 | 0 | 0.01 | 1001 | ALG_MAXSCORE | |
| 1015144 | 2000 | 817 | demo_algo1_1001_0_1 | 1 | 0 | 0.01 | 1001 | ALG_MAXSCORE | |
| 1015144 | 2001 | 0 | demo_algo1_1001_0_1 | 1 | 0 | 0.01 | 1001 | ALG_MAXSCORE | |
| 1015144 | 2002 | 0 | demo_algo1_1001_0_1 | 1 | 0 | 0.01 | 1001 | ALG_MAXSCORE | |
| 1015144 | 2003 | 1352 | demo_algo1_1001_0_1 | 1 | 0 | 0.01 | 1001 | ALG_MAXSCORE | |
| 1015144 | 2004 | 1885 | demo_algo1_1001_0_1 | 1 | 0 | 0.01 | 1001 | ALG_MAXSCORE | |
| 1015144 | 2005 | 3061 | demo_algo1_1001_0_1 | 1 | 0 | 0.01 | 1001 | ALG_MAXSCORE | |
| 1015144 | 2006 | 2809 | demo_algo1_1001_0_1 | 1 | 0 | 0.01 | 1001 | ALG_MAXSCORE | |
| 1015144 | 2007 | 2741 | demo_algo1_1001_0_1 | 1 | 0 | 0.01 | 1001 | ALG_MAXSCORE | |
| 1015144 | 2008 | 3148 | demo_algo1_1001_0_1 | 1 | 0 | 0.01 | 1001 | ALG_MAXSCORE | |

TABLE 16-continued

| | | | | | | | | |
|---|---|---|---|---|---|---|---|---|
| 1015144 | 2009 | 4032 | demo_algo1_1001_0_1 | 1 | 0 | 0.01 | 1001 | ALG_MAXSCORE |
| 1015144 | 2010 | 3765 | demo_algo1_1001_0_1 | 1 | 0 | 0.01 | 1001 | ALG_MAXSCORE |
| 1015144 | 2011 | 7654 | demo_algo1_1001_0_1 | 1 | 0 | 0.01 | 1001 | ALG_MAXSCORE |
| 1015144 | 2012 | 5804 | demo_algo1_1001_0_1 | 1 | 0 | 0.01 | 1001 | ALG_MAXSCORE |

| Indicatorid | demoid | TP exact | TP within1 | TP within 2 | TP within 3 | TP within 4 | FP (actual diff to predicted) |
|---|---|---|---|---|---|---|---|
| 1015144 | 1000 | 0 | 706 | 706 | 706 | 706 | 706 |
| 1015144 | 1001 | 0 | 0 | 0 | 0 | 0 | 0 |
| 1015144 | 1002 | 0 | 0 | 0 | 0 | 0 | 0 |
| 1015144 | 1003 | 0 | 0 | 1418 | 1418 | 1418 | 1418 |
| 1015144 | 1004 | 0 | 0 | 0 | 1675 | 1675 | 1675 |
| 1015144 | 1005 | 0 | 0 | 0 | 0 | 2211 | 2211 |
| 1015144 | 1006 | 0 | 0 | 0 | 0 | 0 | 2420 |
| 1015144 | 1007 | 0 | 0 | 0 | 0 | 0 | 2502 |
| 1015144 | 1008 | 0 | 0 | 0 | 0 | 0 | 3077 |
| 1015144 | 1009 | 0 | 0 | 0 | 0 | 0 | 3728 |
| 1015144 | 1010 | 0 | 0 | 0 | 0 | 0 | 5140 |
| 1015144 | 1011 | 0 | 0 | 0 | 0 | 0 | 9919 |
| 1015144 | 1012 | 0 | 0 | 0 | 0 | 0 | 8322 |
| 1015144 | 2000 | 0 | 0 | 0 | 0 | 0 | 817 |
| 1015144 | 2001 | 0 | 0 | 0 | 0 | 0 | 0 |
| 1015144 | 2002 | 0 | 0 | 0 | 0 | 0 | 0 |
| 1015144 | 2003 | 0 | 0 | 0 | 0 | 0 | 1352 |
| 1015144 | 2004 | 0 | 0 | 0 | 0 | 0 | 1885 |
| 1015144 | 2005 | 0 | 0 | 0 | 0 | 0 | 3061 |
| 1015144 | 2006 | 0 | 0 | 0 | 0 | 0 | 2809 |
| 1015144 | 2007 | 0 | 0 | 0 | 0 | 0 | 2741 |
| 1015144 | 2008 | 0 | 0 | 0 | 0 | 0 | 3148 |
| 1015144 | 2009 | 0 | 0 | 0 | 0 | 0 | 4032 |
| 1015144 | 2010 | 0 | 0 | 0 | 0 | 0 | 3765 |
| 1015144 | 2011 | 0 | 0 | 0 | 0 | 0 | 7654 |
| 1015144 | 2012 | 0 | 0 | 0 | 0 | 0 | 5804 |

B. Distribution Analysis

FIGS. 12-16 illustrate an example of how to use the raw return data to create a distribution analysis. The above return data can be assembled into a matrix. In one example embodiment for "Algorithm Auditing", we may prepare 5 algorithms for ABtesting (e.g., SAVG, BAVG, U, SRAND, and others), 6 probability buckets (0, 0 . . . 0.01, 0.01 . . . 0.02, 0.02 . . . 0.05, 0.05 . . . 0.10, 0.15 . . . 0.20, 0.20 . . . 1.0) and 24 demographics (as shown previously). For each algorithm audit the Oracle responds with another 24 demographics showing "actual" impressions across the demographics. This leads to 17,280 combinations of algorithm+ predicted demographic+score bucket+actual demographic and the resulting actual probability. Given an Oracle audited score tuple, s(a, di, sai, dj, sai).

6. Controlled Testing

In order to test the demographic prediction systems in practice, they were deployed and used for 6 live advertiser campaigns. We created 3 ads using algorithm BAVG and another 2 using SAVG. Female 18to24 was chosen as the demographic target, because the background rate was low (5.37%) and so it would be easier to measure statistical significance. The ads each were to deliver 5,000 impressions over 30 days with a maxCPM of $10. Two of the algorithms were tested in this way. This provided an end-to-end test on a major ad server, with the only variation being the demographic prediction algorithm. The results shown in Table 17, below, suggest that BAVG delivers 3.5 lift over random, and SAVG delivers 2.3.

TABLE 17

Demographics purchased on a Live Ad Campaign Targeting W18to24

| | Cell | Oracle reported random occurrence for W25to54 | Oracle reported W25to54 in-target rate; test campaign | In-Target Lift | Imps |
|---|---|---|---|---|---|
| BAVG | All Ads | 5.37% | 19% | 3.55 | 5,952 |
| | Fresno | 5.37% | 20% | 3.73 | 3,017 |
| | Shreveport | 5.37% | 19% | 3.60 | 1,566 |
| | Wilmington | 5.37% | 17% | 3.09 | 1,369 |
| SAVG | All Ads | 5.37% | 12% | 2.29 | 3,289 |
| | Florence | 5.37% | 10% | 1.79 | 1,443 |
| | LittleRock | 5.37% | 14% | 2.67 | 1,846 |

7. Comparisons to Commonly-Used Commercial Demographic Providers

It is also possible to audit other demographic provider companies against the Oracle. The best third party company showed an in-target lift of 2.4 over random (actually comparable to SAVG at 2.3). The average lift over random was 1.6 (shown in Table 18, below). These provider companies were selected because of their clear naming of age-gender matching our test demographics of W18to24. It provides a useful picture of expected accuracy having randomly drawn 12 commercial demographic providers. In-target lift ranges from 1 (random) to 2.39 for the very best company. Example companies could include, for instance, V12 Group, DLX Demographics, Dataline, BK Demographic, IXI, Media Source, Webbula, Experian, VisualDNA, I-Behavior, Lotame, Alliant, Relevate.

TABLE 18

In-target Rates for Selected Demographic Provider Companies When targeting Female18to24

| Demo Company | In-target lift over random |
|---|---|
| Provider A | 2.39 |
| Provider B | 2.26 |
| Provider C | 1.89 |
| Provider D | 1.82 |
| Provider E | 1.81 |
| Provider F | 1.67 |
| Provider G | 1.43 |
| Provider H | 1.42 |
| Provider I | 1.36 |
| Provider J | 1.08 |
| Provider K | 1.02 |
| Provider L | 1.01 |
| Provider M | 1.00 |

One possible reason why both SAVG and BAVG performed well compared to commercial data providers is the latter might set their services to overly emphasize recall at the expense of precision. Ultimately advertisers pay for these services only if they find them useful, these services may be inclined to provide a predicted positive in many more cases where the evidence for age or gender is slim.

Table 19 illustrates the accuracy of the different third party demographic providers. The top measure is in-target rate, and the bottom measure is the in-target lift. As was the case for the data in table 18, the demographic being measured is Females18to24. Of particular note in these results is that in-target data for first party known subscribers is higher than in-target rates from third party providers.

TABLE 19

Accuracy of Selected Demographic Providers and Oracle Models (Bavg, SegAvg) when targeting Female18to24

| Anonymized Segment name | Random Rate | Lift Female18to24 | In-target Female18to24 |
|---|---|---|---|
| Random | 5.4% | 1.000 | 5.4% |
| Provider A | 5.4% | 1.204 | 6.5% |
| Provider B | 5.4% | 1.473 | 7.9% |
| Provider C | 5.4% | 1.546 | 8.3% |
| Provider D | 5.4% | 1.584 | 8.5% |
| Provider E | 5.4% | 1.620 | 8.7% |
| Provider F | 5.4% | 1.630 | 8.8% |
| Provider G | 5.4% | 1.813 | 9.7% |
| Provider H | 5.4% | 1.951 | 10.5% |
| SegAVG | 5.4% | 2.290 | 12.3% |
| Provider I | 5.4% | 2.315 | 12.4% |
| Provider J | 5.4% | 2.335 | 12.5% |
| Provider K | 5.4% | 2.495 | 13.4% |
| Provider L | 5.4% | 2.621 | 14.1% |
| Provider M | 5.4% | 2.833 | 15.2% |
| Provider N | 5.4% | 2.879 | 15.5% |
| Provider O | 5.4% | 3.094 | 16.6% |
| Bavg | 5.4% | 3.550 | 19.1% |
| Subscriber1 | 5.4% | 6.020 | 32.3% |
| Subscriber2 | 5.4% | 7.630 | 41.0% |

As a further comparison between third party demographic providers and subscriber data, the following Tables 20 and 21 show in-target lift for 4 providers on different age-gender demographics. Subscriber 2 has 10 times better in-target rate on Female 35-44 than random (77% in-target versus 7% expected in-target rate at random). This data illustrates how third party demographic providers can be scored in terms of in-target prediction accuracy.

TABLE 20

Accuracy of demographic providers when targeting different age-gender breaks (measurement is In-target lift)

| Age-Gender | First-party Subscriber 2 | First-party Subscriber 1 | Demo Provider E | Demo Provider F | Random |
|---|---|---|---|---|---|
| F18-24 |  | 6.02 | 1.62 | 1.63 | 1 |
| F25-34 | 7.63 | 2.66 | 2.00 | 1.77 | 1 |
| F35-44 | 10.39 | 4.92 | 2.88 | 1.07 | 1 |
| F45-54 | 8.87 | 4.65 | 2.93 | 1.33 | 1 |
| F55-64 |  | 5.39 | 2.36 | 1.11 | 1 |
| F65-74 | 8.49 | 7.63 | 2.11 | 1.33 | 1 |
| F75+ | 6.04 |  | 1.90 | 1.34 | 1 |
| M18-24 |  | 6.49 | 0.78 | 1.22 | 1 |
| M25-34 | 4.91 | 1.41 | 1.71 | 0.89 | 1 |
| M35-44 |  | 2.11 | 2.30 | 1.34 | 1 |
| M45-54 | 6.84 | 3.38 | 2.22 | 1.13 | 1 |
| M55-64 | 6.37 | 5.07 | 0.61 | 1.19 | 1 |
| M65-74 | 9.88 | 8.66 | 0.83 | 1.12 | 1 |
| M75+ |  | 7.90 | 0.92 | 0.94 | 1 |

TABLE 21

Accuracy of demographic providers when targeting different age-gender breaks (measurement is in-target rate)

| Age-Gender | Subscriber 2 | Subscriber 1 | Provider E | Provider F | Random |
|---|---|---|---|---|---|
| F18-24 |  | 32% | 9% | 9% | 5% |
| F25-34 | 56% | 19% | 15% | 13% | 7% |
| F35-44 | 77% | 37% | 21% | 8% | 7% |
| F45-54 | 82% | 43% | 27% | 12% | 9% |
| F55-64 |  | 50% | 22% | 10% | 9% |
| F65-74 | 63% | 56% | 16% | 10% | 7% |
| F75+ | 44% |  | 14% | 10% | 7% |
| M18-24 |  | 41% | 5% | 8% | 6% |
| M25-34 | 55% | 16% | 19% | 10% | 11% |
| M35-44 |  | 20% | 22% | 13% | 9% |
| M45-54 | 67% | 33% | 22% | 11% | 10% |
| M55-64 | 54% | 43% | 5% | 10% | 8% |
| M65-74 | 60% | 53% | 5% | 7% | 6% |
| M75+ |  | 48% | 6% | 6% | 6% |

Third Party Segment Provider Accuracy Measurement

While much of the preceding discussion has focused on accuracy measurement techniques such as algorithm audits, the present invention can also be used for improved measurement of the accuracy of third party demographic information. Recall that we have a large number of digital segments being provided by third party companies providing information about the user who is requesting ads. The companies may include, for example, Experian, BlueKai, and others.

1. Example for Measuring Segment Accuracy

We now present an example method for measuring the accuracy of these third party demographic providers. In this example, we select segments which have a human-readable definitions comprised of an age and gender definition. In general, these were segments who's title could be an age or gender designation, without any other Boolean qualifiers.

For example: "Experian>Age>20-29" has a human readable intended distribution of Pr(20 . . . 29)=1.0 and ~Pr(20 . . . 29)=0.0.

"i-Behavior→US Data→Demographics powered by AmeriLink→Gender→Female" has an "optimal" distribution of Pr(Female)=1.0 and Pr(Male)=0.0. Thus for both of these cases we could define a known optimal distribution.

The next step is to score each segment provider against Oracle audits to determine the actual distributions that they were providing, according to the Oracle. In other words, we used the Oracle to "audit" each of these segments.

We can summarize the accuracy of various segment providers in matching the Oracle audit distribution using several measures: (a) "probability correct" is equal to the sum of probabilities that are "in-target" for the correct demographic, and is the standard metric that marketers would use (b) "KL-disparity" is a measure of the difference between the Oracle audit distribution and the "Optimal", where differences are treated like percentages (c) R statistic is a measure of the similarity in shape between the audit distribution and "optimal". The results are shown in Table 18, 19, 20, 21.

As illustrated in FIG. 19, analyzing multiple segments makes it possible to identify which ones have the best accuracy for age targeting (e.g., provider O and provider N could have Pr=16% and 15%, respectively). These in-target rates could be many times higher than the Pr of other providers—which would make a huge impact on many campaigns.

As described above, implementations of the present disclosure provide for improved demographic prediction based on aggregated training data. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A system, comprising:
one or more processors; and
memory comprising instructions that when executed by the one or more processors perform operations comprising:
receiving a web request from a user device;
in response to receiving the web request, processing the web request in real-time to perform a real-time prediction for the web request by:
determining a web request property of the web request;
in response to determining the web request property of the web request, determining a plurality of prior web requests, each prior web request of the plurality of prior web requests associated with the web request property and transmitted, via a network connection, to a measurement company with a request to audit the prior web request;
receiving, from the measurement company via a second network connection, results of auditing a batch comprising the plurality of prior web requests;
determining aggregated demographic audit information, associated with the web request property of the web request received from the user device, based on the results of auditing the batch comprising the plurality of prior web requests associated with the web request property of the web request received from the user device;
measuring disagreement between a first segment of the aggregated demographic audit information and a second segment of the aggregated demographic audit information;
determining a first weight for a first web request property and a second weight for a second web request property based on the disagreement between the first segment and the second segment; and
predicting demographics for the web request based on the aggregated demographic audit information, associated with the web request property of the web request received from the user device, using the first weight for the first web request property and the second weight for the second web request property; and
in response to predicting the demographics for the web request, delivering content to the user device based on the demographics for the web request.

2. The system of claim 1, wherein the plurality of prior web requests are encoded with properties that are sent to a third party to query demographic information associated with the plurality of prior web requests, and wherein at least some of the demographic information associated with the properties is then returned.

3. The system of claim 2, wherein the predicting is based on request-level sources of information.

4. The system of claim 3, wherein the request-level sources of information comprise a user-identifier associated with demographic information for a user.

5. The system of claim 2, wherein the aggregated demographic audit information comprises a plurality of web request properties.

6. The system of claim 2, wherein the web request property of the web request comprises a label representing a predicted demographic of a user and an expected probability range of the predicted demographic.

7. The system of claim 6, wherein the operations comprise comparing the demographic information to the label to determine accuracy of the label, and comparing the accuracy of the label with a second accuracy of one or more other labels.

8. The system of claim 7, wherein the operations comprise selecting a demographic prediction model to apply for predicting demographics of the web request based on the comparison of the accuracy of the label with the second accuracy of the one or more other labels.

9. The system of claim 1, wherein the aggregated demographic audit information comprises two or more web request properties.

10. The system of claim 9, wherein the aggregated demographic audit information comprises a plurality of web request properties, and
the operations comprise measuring disagreement between the aggregated demographic audit information of the plurality of web request properties to determine one or more weights.

11. The system of claim 10, wherein the operations comprise determining which web request properties to weight using second aggregated demographic audit information from audit batches as training cases, and creating a matrix of probabilities to represent an expression rate of one or more properties in each audit batch.

12. The system of claim 9,
wherein the two or more web request properties include a measure of the prediction from each model and the operations comprise using the aggregated demographic audit information to predict accuracy of a plurality of demographic prediction models for the web request and selecting at least one demographic prediction model of the plurality of demographic prediction models to apply for predicting demographics of the web request.

13. The system of claim 1, a first prior web request of the plurality of prior web requests transmitted to the measurement company at a first time with a first request to audit the first prior web request, a second prior web request of the plurality of prior web requests transmitted to the measurement company at a second time with a second request to audit the second prior web request, the second time different than the first time.

14. The system of claim 1, wherein a plurality of demographic audit information is used, each originating from a corresponding batch of prior web requests that have been audited by at least one third party.

15. The system of claim 1, wherein the operations comprise performing quality checks on the aggregated demographic audit information prior to using the aggregated demographic audit information for prediction.

16. A method comprising:
receiving a web request from a user device;
determining a web request property of the web request;
determining a plurality of prior web requests, each prior web request of the plurality of prior web requests associated with the web request property and transmitted, via a network connection, to a measurement company with a request to audit the prior web request;
receiving, from the measurement company via a second network connection, results of auditing a batch comprising the plurality of prior web requests;
generating aggregated demographic audit information, associated with the web request property of the web request received from the user device, based on the results of auditing the batch comprising the plurality of prior web requests associated with the web request property of the web request received from the user device;
predicting demographics for the web request based on the aggregated demographic audit information associated with the web request property of the web request received from the user device; and
delivering content to the user device based on the demographics for the web request.

17. The method of claim 16, wherein the plurality of prior web requests are encoded with properties to generate one or more encoded web requests, the method comprising sending the one or more encoded web requests to a third party to query demographic information associated with the plurality of prior web requests.

18. The method of claim 17, comprising:
determining which web request properties to weight using queried demographic information for audit batches as training cases; and
creating a matrix of probabilities to represent an expression rate of one or more properties in each audit batch.

* * * * *